(12) United States Patent
Motoyama et al.

(10) Patent No.: US 7,979,536 B2
(45) Date of Patent: *Jul. 12, 2011

(54) METHOD AND SYSTEM OF REMOTE DIAGNOSTIC, CONTROL AND INFORMATION COLLECTION USING A DYNAMIC LINKED LIBRARY FOR MULTIPLE FORMATS AND MULTIPLE PROTOCOLS WITH SHARING THE RESOURCE

(75) Inventors: Tetsuro Motoyama, Cupertino, CA (US); Avery Fong, Castro Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 734 days.

This patent is subject to a terminal disclaimer.

(21) Appl. No.: 12/056,014

(22) Filed: Mar. 26, 2008

(65) Prior Publication Data
US 2008/0184207 A1 Jul. 31, 2008

Related U.S. Application Data

(63) Continuation of application No. 09/782,187, filed on Feb. 14, 2001, now Pat. No. 7,392,307.

(51) Int. Cl.
*G06F 15/173* (2006.01)
(52) U.S. Cl. ........ 709/224; 709/202; 709/203; 709/217; 709/223
(58) Field of Classification Search .................. 709/202, 709/203, 217, 223–224
See application file for complete search history.

(56) References Cited

U.S. PATENT DOCUMENTS

| | | | |
|---|---|---|---|
| 5,412,779 A | 5/1995 | Motoyama |
| 5,414,494 A | 5/1995 | Aikens et al. |
| 5,537,554 A | 7/1996 | Motoyama |
| 5,544,289 A | 8/1996 | Motoyama |
| 5,568,618 A | 10/1996 | Motoyama |
| 5,649,120 A | 7/1997 | Motoyama |
| 5,706,434 A | 1/1998 | Kremen et al. |
| 5,774,678 A | 6/1998 | Motoyama |
| 5,790,970 A | 8/1998 | Brachert et al. |
| 5,818,603 A | 10/1998 | Motoyama |
| 5,819,110 A | 10/1998 | Motoyama |
| 5,848,386 A | 12/1998 | Motoyama |
| 5,872,909 A | 2/1999 | Wilner et al. |
| 5,872,976 A | 2/1999 | Yee et al. |
| 5,887,216 A | 3/1999 | Motoyama |
| 5,909,493 A | 6/1999 | Motoyama |

(Continued)

FOREIGN PATENT DOCUMENTS
JP 2-172348 7/1990
(Continued)

OTHER PUBLICATIONS

U.S. Appl. No. 12/276,951, filed Nov. 24, 2008, Motoyama.

(Continued)

*Primary Examiner* — Shawki S Ismail
(74) *Attorney, Agent, or Firm* — Oblon, Spivak, McClelland, Maier & Neustadt, L.L.P.

(57) ABSTRACT

A system, method and program product for diagnosing, controlling and collecting information from devices. Information regarding events of a target application executing in an application unit is collected and formatted into one of multiple data formats for transmission through one of multiple communication protocols using at least one shared system resource. The formatted data is transmitted through, e.g., e-mail or FTP to a predetermined destination or may be saved to local storage, e.g., a local disk. By sharing resources, code duplication is reduced or eliminated.

36 Claims, 32 Drawing Sheets

U.S. PATENT DOCUMENTS

| | | |
|---|---|---|
| 6,085,196 A | 7/2000 | Motoyama et al. |
| 6,108,492 A | 8/2000 | Miyachi |
| 6,208,956 B1 | 3/2001 | Motoyama |
| 6,237,143 B1 | 5/2001 | Fontana et al. |
| 6,279,015 B1 | 8/2001 | Fong et al. |
| 6,314,460 B1 | 11/2001 | Knight et al. |
| 6,317,848 B1 | 11/2001 | Sorens et al. |
| 6,327,622 B1 | 12/2001 | Jindal et al. |
| 6,330,628 B1 | 12/2001 | Motoyama |
| 6,421,608 B1 | 7/2002 | Motoyama et al. |
| 6,473,812 B2 | 10/2002 | Motoyama |
| 6,553,336 B1 | 4/2003 | Johnson et al. |
| 6,581,092 B1 | 6/2003 | Motoyama et al. |
| 6,631,247 B1 | 10/2003 | Motoyama et al. |
| 6,662,225 B1 | 12/2003 | Motoyama et al. |
| 6,714,971 B2 | 3/2004 | Motoyama et al. |
| 6,757,714 B1 | 6/2004 | Hansen |
| 6,785,711 B1 | 8/2004 | Motoyama et al. |
| 6,801,331 B1 | 10/2004 | Motoyama |
| 6,857,016 B1 | 2/2005 | Motoyama et al. |
| 6,889,263 B2 | 5/2005 | Motoyama |
| 6,915,337 B1 | 7/2005 | Motoyama et al. |
| 6,915,342 B1 | 7/2005 | Motoyama |
| 6,928,493 B2 | 8/2005 | Motoyama |
| 6,948,175 B1 | 9/2005 | Fong et al. |
| 6,961,659 B2 | 11/2005 | Motoyama et al. |
| 6,970,952 B2 | 11/2005 | Motoyama |
| 6,988,141 B1 | 1/2006 | Motoyama et al. |
| 7,043,551 B2 | 5/2006 | Motoyama et al. |
| 7,047,293 B2 | 5/2006 | Motoyama et al. |
| 7,053,767 B2 | 5/2006 | Petite et al. |
| 7,120,674 B1 | 10/2006 | Motoyama et al. |
| 7,120,707 B2 | 10/2006 | Motoyama |
| 7,131,070 B1 | 10/2006 | Motoyama et al. |
| 7,171,670 B2 | 1/2007 | Motoyama et al. |
| 7,185,080 B1 | 2/2007 | Motoyama |
| 7,194,560 B2 | 3/2007 | Motoyama |
| 7,287,085 B1 | 10/2007 | Motoyama et al. |
| 7,293,081 B2 | 11/2007 | Motoyama et al. |
| 7,296,079 B2 | 11/2007 | Motoyama et al. |
| 7,349,964 B2 | 3/2008 | Motoyama et al. |
| 7,353,273 B2 | 4/2008 | Motoyama et al. |
| 7,356,579 B1 | 4/2008 | Motoyama et al. |
| 7,359,970 B2 | 4/2008 | Motoyama et al. |
| 7,363,627 B2 | 4/2008 | Motoyama et al. |
| 7,376,728 B1 | 5/2008 | Motoyama et al. |
| 7,383,359 B2 | 6/2008 | Motoyama et al. |
| 2002/0004812 A1 | 1/2002 | Motoyama |
| 2002/0007390 A1 | 1/2002 | Motoyama |
| 2002/0083168 A1 | 6/2002 | Sweeney et al. |
| 2002/0152235 A1 | 10/2002 | Motoyama et al. |
| 2002/0152292 A1 | 10/2002 | Motoyama et al. |
| 2003/0093522 A1 | 5/2003 | Motoyama |
| 2004/0068549 A1 | 4/2004 | Motoyama |
| 2004/0215744 A1 | 10/2004 | Motoyama et al. |
| 2004/0226018 A1 | 11/2004 | Motoyama et al. |
| 2005/0015487 A1 | 1/2005 | Motoyama et al. |
| 2005/0033872 A1 | 2/2005 | Motoyama |
| 2005/0063367 A1 | 3/2005 | Motoyama |
| 2005/0137908 A1 | 6/2005 | Fusari et al. |
| 2005/0165926 A1 | 7/2005 | Motoyama et al. |
| 2005/0165927 A1 | 7/2005 | Motoyama et al. |
| 2005/0165929 A1 | 7/2005 | Motoyama |
| 2005/0177642 A1 | 8/2005 | Motoyama et al. |
| 2005/0210131 A1 | 9/2005 | Motoyama et al. |
| 2005/0246439 A1 | 11/2005 | Fong et al. |
| 2005/0256934 A1 | 11/2005 | Motoyama |
| 2006/0005085 A1 | 1/2006 | Zunino et al. |
| 2006/0031538 A1 | 2/2006 | Motoyama et al. |
| 2006/0041380 A1 | 2/2006 | Motoyama et al. |
| 2006/0075097 A1 | 4/2006 | Motoyama |
| 2006/0101125 A1 | 5/2006 | Motoyama |
| 2006/0164683 A1 | 7/2006 | Motoyama et al. |
| 2006/0168063 A1 | 7/2006 | Motoyama |
| 2006/0168085 A1 | 7/2006 | Motoyama |
| 2007/0027951 A1 | 2/2007 | Motoyama et al. |
| 2007/0033266 A1 | 2/2007 | Motoyama et al. |
| 2007/0033268 A1 | 2/2007 | Motoyama et al. |
| 2007/0033530 A1 | 2/2007 | Motoyama et al. |
| 2007/0201496 A1 | 8/2007 | Motoyama |
| 2008/0022293 A1 | 1/2008 | Motoyama et al. |
| 2008/0028091 A1 | 1/2008 | Motoyama et al. |
| 2008/0040480 A1 | 2/2008 | Motoyama et al. |
| 2008/0065766 A1 | 3/2008 | Motoyama et al. |

FOREIGN PATENT DOCUMENTS

| | | |
|---|---|---|
| JP | 11-17738 | 1/1999 |
| JP | 2000-270148 | 9/2000 |
| JP | 2000-311154 | 11/2000 |

OTHER PUBLICATIONS

U.S. Appl. No. 12/710,971, filed Feb. 23, 2010, Motoyama, et al.
U.S. Appl. No. 12/715,116, filed Mar. 1, 2010, Motoyama, et al.
U.S. Appl. No. 09/108,705, filed Jul. 1, 1998, Motoyama.
U.S. Appl. No. 09/192,583, filed Nov. 17, 1998, Motoyama.
U.S. Appl. No. 09/393,677, filed Sep. 10, 1999, Motoyama, et al.
U.S. Appl. No. 09/440,692, filed Nov. 16, 1999, Motoyama, et al.
U.S. Appl. No. 09/440,646, filed Nov. 16, 1999, Motoyama, et al.
U.S. Appl. No. 09/440,645, filed Nov. 16, 1999, Motoyama, et al.
U.S. Appl. No. 12/029,508, filed Feb. 12, 2008, Motoyama, et al.
U.S. Appl. No. 12/028,281, filed Feb. 8, 2008, Motoyama, et al.
U.S. Appl. No. 12/056,014, filed Mar. 26, 2008, Motoyama, et al.

| Return Value | Function Name | Description |
|---|---|---|
| bool | getNextSession | Returns false when there is no more session; true otherwise |
| string | getFileName | Returns file name for the EventData |
| map<string, string> | getSessionInformation | Returns the map. Keys are UserID, ApplicationID, CumulativeSessionNumber, StartTime, and Duration. |
| map<string, vector<string>> | getSessionEventData | Returns the map. Keys are EventName and EventTiming. The values of EventTiming vector are in the unit of 10th of a second converted from unsigned integer to string. |

FIG. 12B

| Return Value | Function Name | Description |
| --- | --- | --- |
| bool | getNextLine | Returns one line of string data as an out parameter string. The function returns true if there is a line; false if no more line exists with empty string. |
| string | getFileNameWithSuffix | Returns file name for the data with suffix if applicable |
| enum | getDataType | Returns the data type, BINARY or TEXT |

FIG. 12C

| Key | Value |
|---|---|
| 10 | { 1　　10　　30　　100　　105 } |
| 20 | { 1　　10　　30　　100　　105 } |

FIG. 26A

1. Set return-bool to true
2. Use find function of the Map for inOut_nFormat
3. If returned iterator is end (Not found), set inOut_nFormat to the default value(10) and set return-bool to false
4. get the Set value for the key format
5. Use the find function of the Set for inOut_nProtocol
6. if returned iterator is end (Not found), set inOut_nProtocol to default (1) and set return-bool to false
7. return return-bool

FIG. 26B

| Key | Value | |
|---|---|---|
| 1 | Key | Value |
| | 1 | 1 |
| | 10 | 10 |
| | 30 | 30 |
| | 100 | 100 |
| | 105 | 105 |
| 5 | Key | Value |
| | 1 | 1 |
| | 10 | 30 |
| | 30 | 30 |
| | 100 | 105 |
| | 105 | 105 |

FIG. 27A

1. Set return-bool = true
2. Use find function of the Map for inOut_nFormat
3. If returned iterator is end, set inOut_nFormat to the default value (5) and set return-bool to false
4. Get the Map corresponding to the key format
5. Use the find function of the Map for inOut_nProtocol
6. if returned iterator is end{
    set inOut_nProtocol to default (105)
    and set return-bool to false
    }
   else {
    return-bool = (inOut_nProtocol EQ
            (Value field corresponding to
            inOut_nProtocol))
                logical-AND return-bool.
    set inOut_nProtocol =
    (Value field corresponding to inOut_nProtocol).
    }
7. return return-bool

FIG. 27B

METHOD AND SYSTEM OF REMOTE DIAGNOSTIC, CONTROL AND INFORMATION COLLECTION USING A DYNAMIC LINKED LIBRARY FOR MULTIPLE FORMATS AND MULTIPLE PROTOCOLS WITH SHARING THE RESOURCE

CROSS-REFERENCES TO RELATED APPLICATIONS

This application is a continuation application of U.S. patent application Ser. No. 09/782,187, filed Feb. 14, 2001 now U.S. Pat. No. 7,392,307, the contents of which are incorporated herein by reference.

This application related to and being concurrently filed with three other patent applications: U.S. patent application Ser. No. 09/782,187, entitled "Method and System of Remote Diagnostic, Control and Information Collection Using Multiple Formats and Multiple Protocols with Verification of Formats and Protocols"; U.S. patent application Ser. No. 09/782,064, entitled "Object-oriented Method and System of Remote Diagnostic, Control and Information Collection Using Multiple Formats and Multiple Protocols"; and U.S. patent application Ser. No. 09/782,083, entitled "Method and System of Remote Diagnostic, Control and Information Collection Using Multiple Formats and Multiple Protocols with Delegating Protocol Processor", each filed Feb. 14, 2001, and incorporated herein by reference. The present application is also related to U.S. patent application Ser. No. 09/190,460, filed Nov. 13, 1998, entitled "Method and System for Translating Documents Using Different Translation Resources for Different Portions of the Documents," which is a continuation of U.S. patent application Ser. No. 08/654,207, filed May 28, 1996, entitled "Method and System for Translating Documents Using Different Translation Resources for Different Portions of the Documents," now U.S. Pat. No. 5,848,386; U.S. patent application Ser. No. 08/997,482, filed Dec. 23, 1997, entitled "Object-oriented System and Computer Program Product for Mapping Structured Information to Different Structured Information," now U.S. Pat. No. 6,085,196; U.S. patent application Ser. No. 08/997,705, filed Dec. 23, 1997, entitled "Method and Apparatus for Providing a Graphical User Interface for Creating and Editing a Mapping of a First Structural Description to a Second Structural Description"; U.S. patent application Ser. No. 09/756,120, filed Jan. 9, 2001, entitled "Method and System of Remote Support of Device Using E-mail"; U.S. patent application Ser. No. 09/668,162, filed Sep. 25, 2000, entitled "Method and System of Data Collection and Mapping From a Remote Position Reporting Device"; U.S. patent application Ser. No. 09/575,710, filed Jul. 25, 2000, entitled "Method and System of Remote Diagnostic and Information Collection and Service System"; U.S. patent application Ser. No. 09/575,702, filed Jul. 12, 2000, entitled "Method and System of Remote Position Report Device"; U.S. patent application Ser. No. 09/453,934, filed May 17, 2000, entitled "Method and System of Remote Diagnostic, Control and Information Collection Using a Dynamic Linked Library for Multiple Formats and Multiple Protocols"; U.S. patent application Ser. No. 09/453,935, filed May 17, 2000, entitled "Method and System of Remote Diagnostic, Control and Information Collection Using a Dynamic Linked Library of Multiple Formats and Multiple Protocols With Intelligent Protocol Processor"; U.S. patent application Ser. No. 09/453,937, filed May 17, 2000, entitled "Method and System of Remote Diagnostic, Control and Information Collection Using a Dynamic Linked Library of Multiple Formats and Multiple Protocols With Restriction on Protocol"; U.S. patent application Ser. No. 09/453,936, filed May 17, 2000, entitled "Method and System of Remote Diagnostic, Control and Information Collection Using a Dynamic Linked Library of Multiple Formats and Multiple Protocols with Intelligent Formatter"; U.S. patent application Ser. No. 09/542,284, filed Apr. 4, 2000, entitled "System and Method to Display Various Messages While Performing the Tasks or While Idling"; U.S. patent application Ser. No. 09/520,368, filed on Mar. 7, 2000, entitled "Method and System for Updating the Device Driver of a Business Office Appliance"; U.S. patent application Ser. No. 09/453,877, filed Feb. 4, 2000, entitled "Method and System for Maintaining a Business Office Appliance through Log Files"; U.S. patent application Ser. No. 09/440,692, filed Nov. 16, 1999, entitled "Method and System to Monitor the Application Usage and Send Back the Information Using Connection and Connectionless Mode"; U.S. patent application Ser. No. 09/440,693, filed Nov. 16, 1999, entitled "Method and System of Remote Diagnostic, Control and Information Collection Using a Dynamic Linked Library"; U.S. patent application Ser. No. 09/440,647, filed Nov. 16, 1999, entitled "Method and System to Monitor the Application Usage and Send Back the Information Using Connection and Connectionless Mode"; U.S. patent application Ser. No. 09/440,646, filed Nov. 16, 1999, entitled "Method and System to Monitor the Application Usage and Send Back the Information Using Connection and Connectionless Mode"; U.S. patent application Ser. No. 09/440,645, filed Nov. 16, 1999, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manager"; U.S. patent application Ser. No. 09/407,769, filed Sep. 29, 1999, entitled "Method and System for Remote Diagnostic, Control and Information Collection Based on various Communication Modes for Sending Messages to Users"; U.S. patent application Ser. No. 09/393,677, filed Sep. 10, 1999, entitled "Application Unit Monitoring and Reporting System and Method"; U.S. patent application Ser. No. 09/311,148, filed May 13, 1999, entitled "Application Unit Monitoring and Reporting System and Method"; U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26, 1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216; U.S. patent application Ser. No. 08/733,134, filed Oct. 16, 1996, entitled "Method and System for Diagnosis and Control of Machines Using Connectionless Modes of Communication," now U.S. Pat. No. 5,909,493; U.S. patent application Ser. No. 08/880,683, filed Jun. 23, 1997, U.S. patent application Ser. Nos. 09/107,989 and 09/108,705, both of which were filed Jul. 1, 1998, all three of which are entitled "Method and System for Controlling and Communicating with Machines Using Multiple Communication Formats," and all three of which are divisions of U.S. patent application Ser. No. 08/624,228, filed Mar. 29, 1996, entitled "Method and System for Controlling and Communicating with Machines Using Multiple Communication Formats," now U.S. Pat. No. 5,818,603; U.S. patent application Ser. No. 09/457,669, entitled "Method and System for Diagnosis and Control of Machines Using Connection and Connectionless Modes of Communication," filed Dec. 9, 1999, which is a continuation of U.S. patent application Ser. No. 08/916,009, entitled "Method and System for Diagnosis and Control of Machines Using Connection and Connectionless Modes of Communication," filed Aug. 21, 1997, which is a continuation of, and U.S. patent application Ser. Nos. 08/738,659 and 08/738,461, filed Oct. 30, 1996, both of which are entitled "Method and System for Diagnosis and Control of Machines Using Connection and Connectionless Modes of Communication," which are divisions of, U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110; and U.S. patent application Ser. No. 08/852,413, filed May 7, 1987, entitled "Method and System for Controlling and Communicating with Business Office Devices," now U.S. Pat. No. 5,774,678, which is a continuation of U.S. patent application Ser. No. 08/698,068, filed Aug. 15, 1996, entitled "Method and Apparatus for Controlling and Communicating With Business Office Devices", now U.S. Pat. No. 5,649,120, which is a continuation of U.S. patent application Ser. No. 08/562,192, filed Nov. 22, 1995, now U.S. Pat. No. 5,568,618, entitled "Method and Apparatus for Controlling and Communicating With Business Office Devices", which is a continuation of U.S. patent application Ser. No. 08/473,780, filed Jun. 6, 1995, entitled "Method and Apparatus for Controlling and Communicating With Business Office Devices", now U.S. Pat. No. 5,544,289, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, which is a continuation of U.S. patent application Ser. No. 08/282,168, filed Jul. 28, 1994, entitled "Method and Apparatus for Controlling and Communicating With Business Office Devices", now U.S. Pat. No. 5,412,779, which is a continuation of U.S. patent application Ser. No. 07/902,462, filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to a method, system and program product for monitoring and communicating events at plural target applications of an application unit by using at least one resource such as a Dynamic Linked Library (DLL) shared among the plural target applications. The DLL supports multiple data formats and multiple communication protocols to communicate the event data. The application unit specifies at least one communication protocol to be used to report the information in at least one data format from the application unit. Each of the at least one communication protocol and each of the at least one data format are defined through an interface function. Additionally, the DLL sends a file which includes the information to be reported through a communication protocol as discussed above sharing the same functions to handle processing of the communication protocols. Resources such as a system clock, a persistent system registry, Simple Mail Transfer Protocol (SMTP) and File Transfer Protocol (FTP) are shared by including a system resource that can be used by multiple software classes across the system.

2. Discussion of the Background

With the rise of microprocessor-based appliances and devices, software development has clearly become a significant business. In evaluating and supporting appliances and devices, it may be beneficial to monitor exactly how events in an appliance and device occur and how the states are changing. An example of events is an action caused by user interaction with an appliance. It may be helpful for a software developer to know which commands a user uses most often and how long those commands take to execute. Such an analysis is often referred to as "profiling." (Analogous analysis was performed, e.g., on instructions in instruction sets to develop reduced instruction set computing (RISC) instructions.)

Further, in designing appliances and devices with which a human interacts, it may be desirable to monitor how the user interacts with such appliances and devices. As an example, it may be desirable to monitor how a user utilizes a control panel of an image forming device such as a photocopier, facsimile machine, printer, scanner, or an appliance such as a microwave oven, VCR, digital camera, cellular phone, palm top computer, etc.

Further, it may be desirable to monitor the state of the appliances and devices to provide diagnostics, services and maintenance needs. Some events may be caused by internal changes within the appliances and devices. Some events may be caused by abnormal conditions such as a paper jam in a copier. Some error conditions and warning conditions may be caused by, e.g., errors in the software installed in target appliances and devices.

Further, users are increasingly utilizing the Internet. There is significant interest in how users use the Internet, particularly with respect to how users may use certain web pages. Therefore, monitoring a user's usage of the Internet or its successor may also become significant.

It may also be desirable to determine how a user is utilizing a certain application unit (e.g., a computer running a software application, a device with an interface to be operated by a user, or a web page). The user's usage of the application unit must then be monitored and effectively communicated to a remote party.

SUMMARY OF THE INVENTION

Accordingly, one object of the present invention is to provide a novel and effective system for monitoring events of a target application of an application unit using at least one shared system resource.

A further object of the present invention is to provide a system for communicating data obtained by monitoring events of a target application of an application unit to a remote party.

A further object of the present invention is to provide a system for communicating data obtained by monitoring events of a target application of an application unit to a remote party allowing various data formats and communication protocols to facilitate the communication system configuration and received data analysis.

A further object of the present invention is to provide a system for communicating data obtained by monitoring events of a target application of an application unit to a remote party allowing various data formats that ease the analyses of received data at a receiving side.

A further object of the present invention is to efficiently communicate the monitored event information to a transmission unit.

A further object of the present invention is to efficiently verify the combination of two parameters specifying the data format and communication protocol and to satisfy a restriction requirement on the second parameter specifying the communication protocol.

A further object of the present invention is to communicate externally stored information through the mechanism available for the communication of the monitored event information.

The present invention achieves these and other objects by monitoring the events of a target application of an application unit or by receiving an instruction to send available stored information through a specified communication protocol using a shared system resource to reduce or eliminate duplication of code. Examples of monitoring and of available stored information include (1) monitoring or logging data of a software program being executed on a computer or workstation under control of a user, (2) monitoring usage data of a control panel of an image forming apparatus (e.g., a copying machine, printer, facsimile, or scanner), or an appliance (e.g., a microwave oven, VCR, digital camera, cellular phone, or palm top computer), (3) monitoring or logging data regarding any internal state changes such as error conditions and warning conditions within appliances, devices and any systems and sending the results when requested or when events occur or when a preset time interval has passed, (4) externally monitoring states of appliances, devices or systems by polling at regular intervals, and (5) generally monitoring or logging any other device or service. The data obtained by monitoring events of a target application of an application unit, appliance, or device can, as a further feature in the present invention, be collected, logged and communicated to a desired location by a store-and-forward protocol (e.g., Internet e-mail) or a "direct" connection protocol, e.g., in which a socket connection is made to an ultimate destination machine (e.g., using FTP or HTTP). The use of store-and-forward communication reduces the costs associated with communicating such data. The data can be communicated to the desired location upon the occurrence of at least one of several events. Such events may include, e.g., each time a user exits a target application, or the completion of a predetermined number of times that a user has utilized and exited the target application of the application unit. If the configuration allows and if necessary, a direct connection between the monitored application and the monitoring system can be established in addition to the store-and-forward communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12B is an exemplary EventData class interface for use in the architecture of FIG. 12A;

FIG. 12C is an exemplary FormattedData class interface for use in the architecture of FIG. 12A;

FIGS. 26A and 26B are an exemplary data structure and algorithm used in a checkAndModifyCombination( ) function of a CCombinationCheckForMonitoring class; and FIGS. 27A and 27B are an exemplary data structure and algorithm used in the checkAndModifyCombination( ) function of the CCombinationCheckForFileSend class.

DESCRIPTION OF THE PREFERRED EMBODIMENTS

Figure 1:
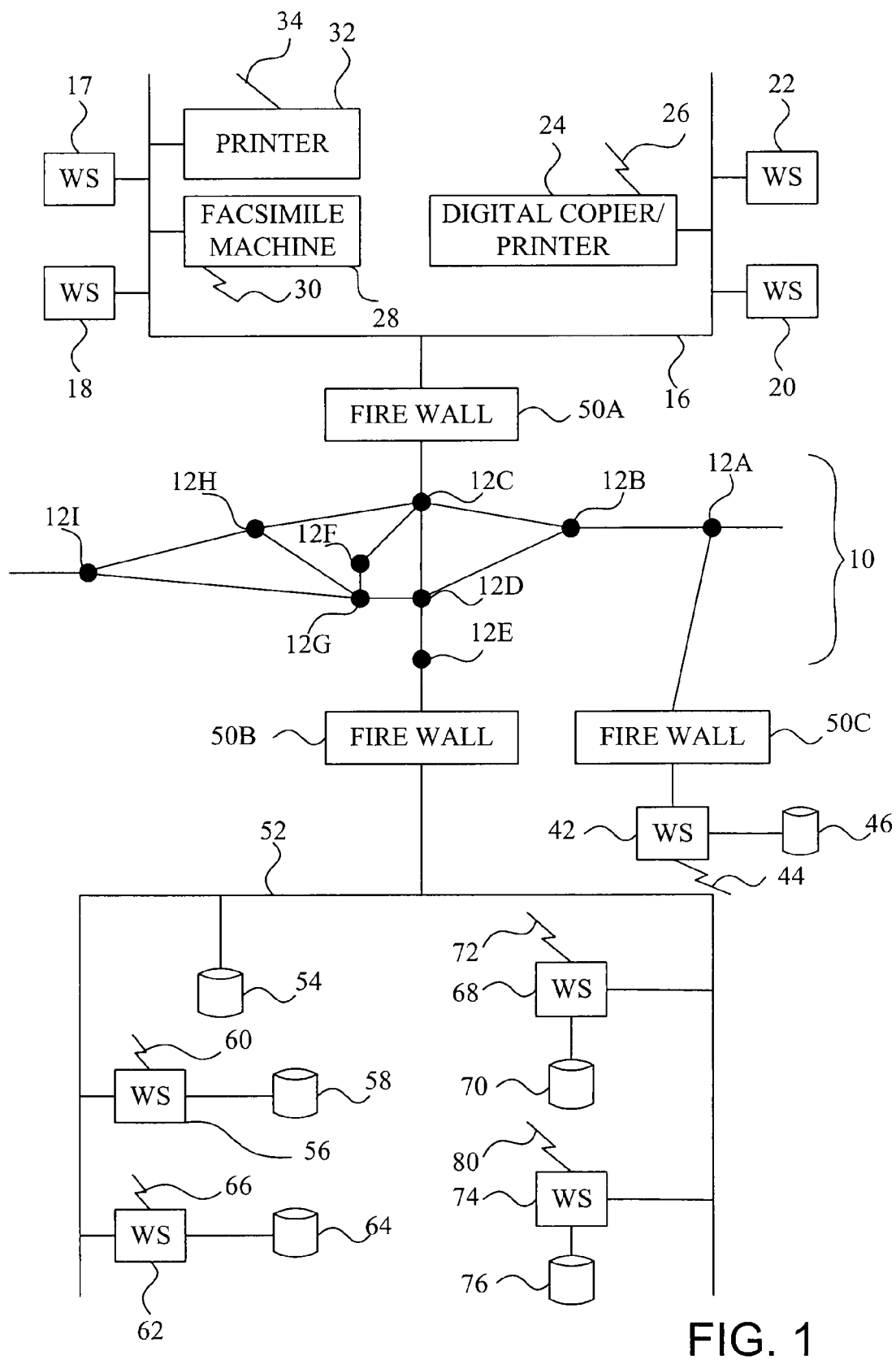
FIG. 1 illustrates three networked business office machines connected to a network of computers and databases through the Internet.

Referring now to the drawings, wherein like reference numerals designate identical or corresponding parts throughout the several views, and more particularly to FIG. 1 thereof, there are illustrated (1) various machines and (2) computers for monitoring, diagnosing and controlling the operation of the machines. In FIG. 1, there is a first network 16, such as a Local Area Network (LAN) connected to computer workstations 17, 18, 20 and 22. The workstations can be any type of computers including, e.g., IBM Personal Computer compatible devices, Unix-based computers, or Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines or monitored devices and other types of devices may be used as the machines or monitored devices, including any of the devices discussed below. In some configurations, one or more workstations may be converted to business office appliances. One example of such a business office appliance is eCabinet from Ricoh which was demonstrated at Fall Comdex in 1999 at Las Vegas. Also, a facsimile server (not illustrated) may be connected to the network 16 and have a telephone, ISDN (Integrated Services Digital Network), cable or wireless connection. In addition to the digital image forming apparatus 24, facsimile machine 28, and printer 32 being connected to the network 16, these devices may also include conventional telephone and/or ISDN and/or cable and/or wireless connections 26, 30 and 34, respectively. As is explained below, the business office machines, business devices or business office appliances 24, 28 and 32 communicate with a remote monitoring, diagnosis and control station, also referred to as a monitoring device, through the Internet via the network 16 or by a direct telephone, ISDN, wireless, or cable connection.

In FIG. 1, a wide area network (WAN) (e.g., the Internet or its successor) is generally designated by 10. The WAN 10 can either be a private WAN, a public WAN or a hybrid. The WAN 10 includes a plurality of interconnected computers and routers designated by 12A-12I. The manner of communicating over a WAN is known through a series of RFC documents obtained by HTTP://www.ietf.org/rfc.html, including RFC 821 entitled "Simple Mail Transfer Protocol" from Internet Engineering Task Force (IETF); RFC 822 entitled "Standard for the Format of ARPA Internet Text Message" from IETF; RFC 959 entitled "File Transfer Protocol (FTP)" from IETF; RFC 2045 entitled "Multipurpose Internet Mail Extensions (MIME) Part One: Format of Internet Message Bodies" from IETF; RFC 1894 entitled "An Extensible Message Format for Delivery Status Notifications"; RFC 1939 entitled "Post Office protocol—Version 3"; and RFC 2298 entitled "An Extensible Message Format for Message Disposition Notifications." The contents of each of these references are incorporated herein by reference.

TCP/IP related communication is described, for example, in the book "TCP/IP Illustrated," Vol. 1, The Protocols, by W. R. Stevens, from Addison-Wesley Publishing Company, 1994, which is incorporated herein by reference. Volumes 1-3 of "Internetworking with TCP/IP" by Corner and Stevens are also incorporated herein by reference in their entirety.

In FIG. 1, a firewall 50A is connected between the WAN 10 and the network 16. A firewall is a device that allows only authorized computers on one side of the firewall to access a network, computers or individual parts on the other side of the firewall. Firewalls are known and commercially available devices and/or software (e.g., SunScreen from Sun Microsystems Inc.). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, Addison-Wesley Publishing, and "Building Internet Firewalls" by D. B. Chapman and E. D. Zwicky, 1995, O'Reilly & Associates, Inc. The contents of those references are incorporated herein by reference.

The network 52 is a conventional network and includes a plurality of workstations 56, 62, 68 and 74. These workstations may be in different departments (e.g., marketing, manufacturing, design engineering and customer service departments) within a single company. In addition to the workstations connected via the network 52, there is a workstation 42, which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable.

Information of the business office machines, business devices or business office appliances 24, 28 and 32 may be stored in one or more of the databases stored in the disks 46, 54, 58, 64, 70 and 76. Known databases include (1) SQL databases by Microsoft, Oracle and Sybase (2) other relational databases, and (3) non-relational databases (including object oriented databases). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases.

In addition to the workstations 56, 62, 68, 74 and 42 being connected to the WAN, these workstations may also include a connection to a telephone line, ISDN, cable, or wireless network which provides a secure connection to the machine being monitored, diagnosed and/or controlled and is used during communication. Additionally, if one communication medium is not operating properly, one of the others can be automatically used for communication.

A feature of the present invention is the use of a "store-and-forward" mode of communication (e.g., Internet electronic mail) or transmission between a machine and a computer for diagnosing and controlling the machine. Alternatively, the message which is transmitted may be implemented using a mode of communication that makes direct, end-to-end connections (e.g., using a socket connection to the ultimate destination) such as FTP and HTTP.

Figure 2:
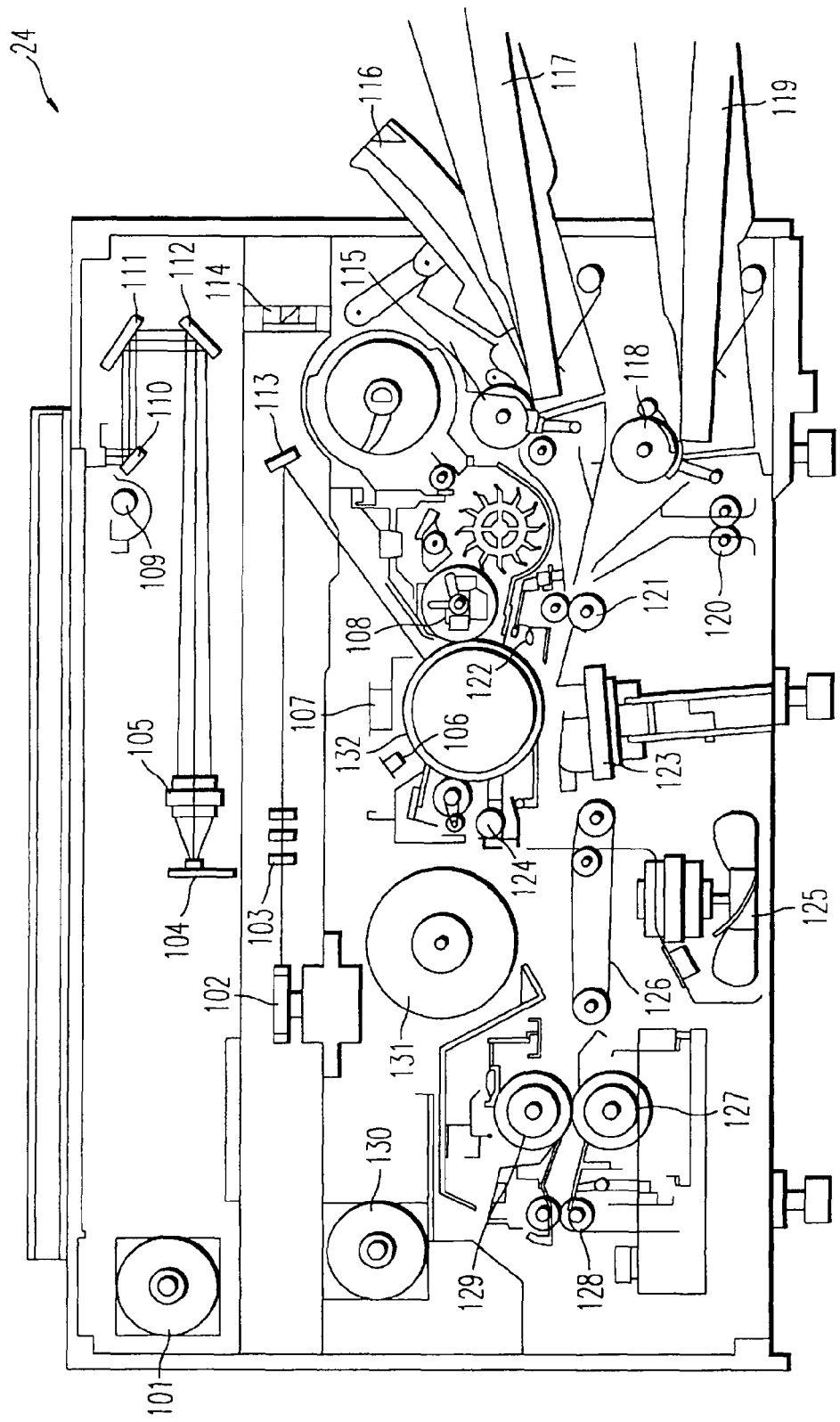
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner. 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital image forming apparatus, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller. 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital image forming apparatus.

Figure 3:
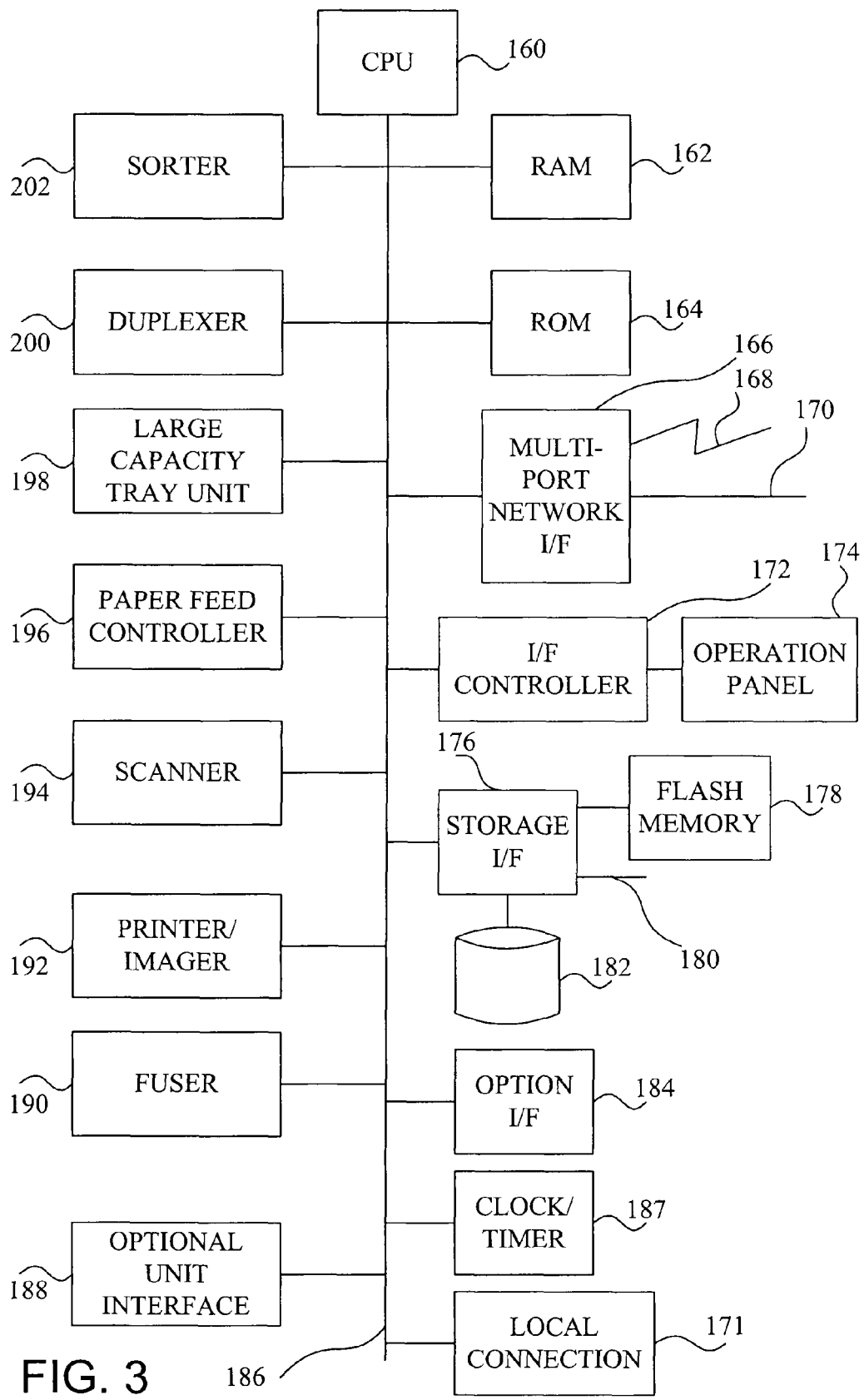
FIG. 3 illustrates the electronic components of the digital image forming apparatus illustrated in FIG. 2.

FIG. 3 illustrates a block diagram of the electronic components illustrated in FIG. 2. The CPU 160 is a microprocessor and acts as the system controller. Random access memory (RAM) 162 stores dynamically changing information including operating parameters of the digital image forming apparatus. A non-volatile memory (e.g., a read only memory (ROM) 164 or a Flash Memory) stores (1) the program code used to run the digital image forming apparatus and (2) static-state data, describing the copier (e.g., the model number, serial number of the copier, and default parameters).

There is a multi-port network interface 166 which allows the digital image forming apparatus to communicate with external devices through at least one network. Reference number 168 represents a telephone, ISDN, or cable line, and numeral 170 represents another type of network. Additional details of the multi-port network interface are described with respect to FIG. 4. An interface controller 172 is used to connect an operation panel 174 to a system bus 186. The operation panel 174 includes standard input and output devices found on a digital image forming apparatus including a copy button, keys to control the operation of the copier such as number of copies, reducement/enlargement, darkness/lightness, etc. Additionally, a liquid crystal display may be included within the operation panel 174 to display parameters and messages of the digital image forming apparatus to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the contents of which are incorporated herein by reference. Preferably, communication utilizes a "reliable" protocol with error detection and retransmission.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital image forming apparatus. The flash memory 178 is used to store semi-static state data which describes parameters of the digital image forming apparatus which infrequently change over the life of the copier. Such parameters include the options and configuration of the digital image forming apparatus. An option interface 184 allows additional hardware such as an external interface to be connected to the digital image forming apparatus. A clock/timer 187 is utilized to keep track of both the time and date and also to measure elapsed time.

On the left side of FIG. 3, the various sections making up the digital image forming device are illustrated. Reference numeral 202 designates a sorter and contains sensors and actuators used to sort the output of the digital image forming device. There is a duplexer 200 which allows a duplex operation to be performed by the digital image forming device and includes conventional sensors and actuators. The digital image forming device includes a large capacity tray unit 198 which allows paper trays holding a large number of sheets to be used with the digital image forming device. The large capacity tray unit 198 includes conventional sensors and actuators.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital image forming device and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device.

Figure 4:
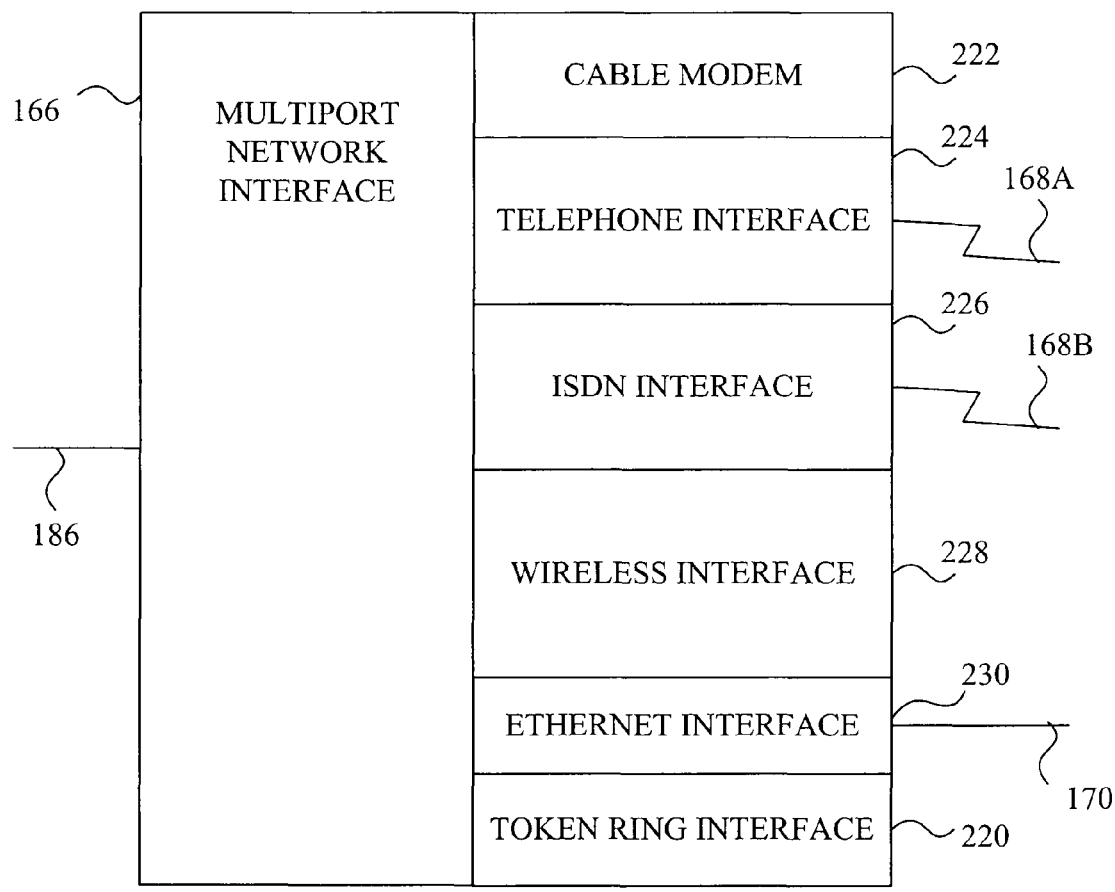
FIG. 4 illustrates details of a multi-port communication interface illustrated in FIG. 3.

FIG. 4 illustrates details of the multi-port network interface 166. The digital image forming device may communicate to external devices through a Token Ring interface 220, a cable modem unit 222 which has a high speed connection over cable, a conventional telephone interface 224 which connects to a telephone line 168A, an ISDN interface 226 which connects to an ISDN line 168B, wireless interface 228, and an Ethernet interface 230 which connects to a LAN 170. Other interfaces (not shown) include, but are not limited to, Digital Subscriber Line (DSL) (original DSL, concentric DSL, and asymmetric DSL). A single device which connects to both a Local Area Network and a telephone line is commercially available from Megahertz and is known as the Ethernet-Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162 or the flash memory 178 or disk 182)). Additionally, the static state memory may be a device other than the ROM 164 such as a non-volatile memory including either of the flash memory 178 or disk 182.

The above details have been described with respect to a digital image forming device but the present invention is equally applicable to other business office machines or devices such as an analog copier, a facsimile machine, a scanner, a printer, a facsimile server, or other business office machines and business office appliance, or appliances (e.g., a microwave oven, VCR, digital camera, cellular phone, palm top computer). Additionally, the present invention includes other types of devices which operate using store-and-forward or direct connection-based communication. Such devices include metering systems (including gas, water, or electricity metering systems), parking meters, vending machines, or any mechanical devices (e.g., automobiles) that need to be monitored during operation or remote diagnosis. In addition to monitoring special purpose machines and computers, the invention can be used to monitor, control, and diagnose a general purpose computer which would be the monitored and/or controlled device.

Figure 5:
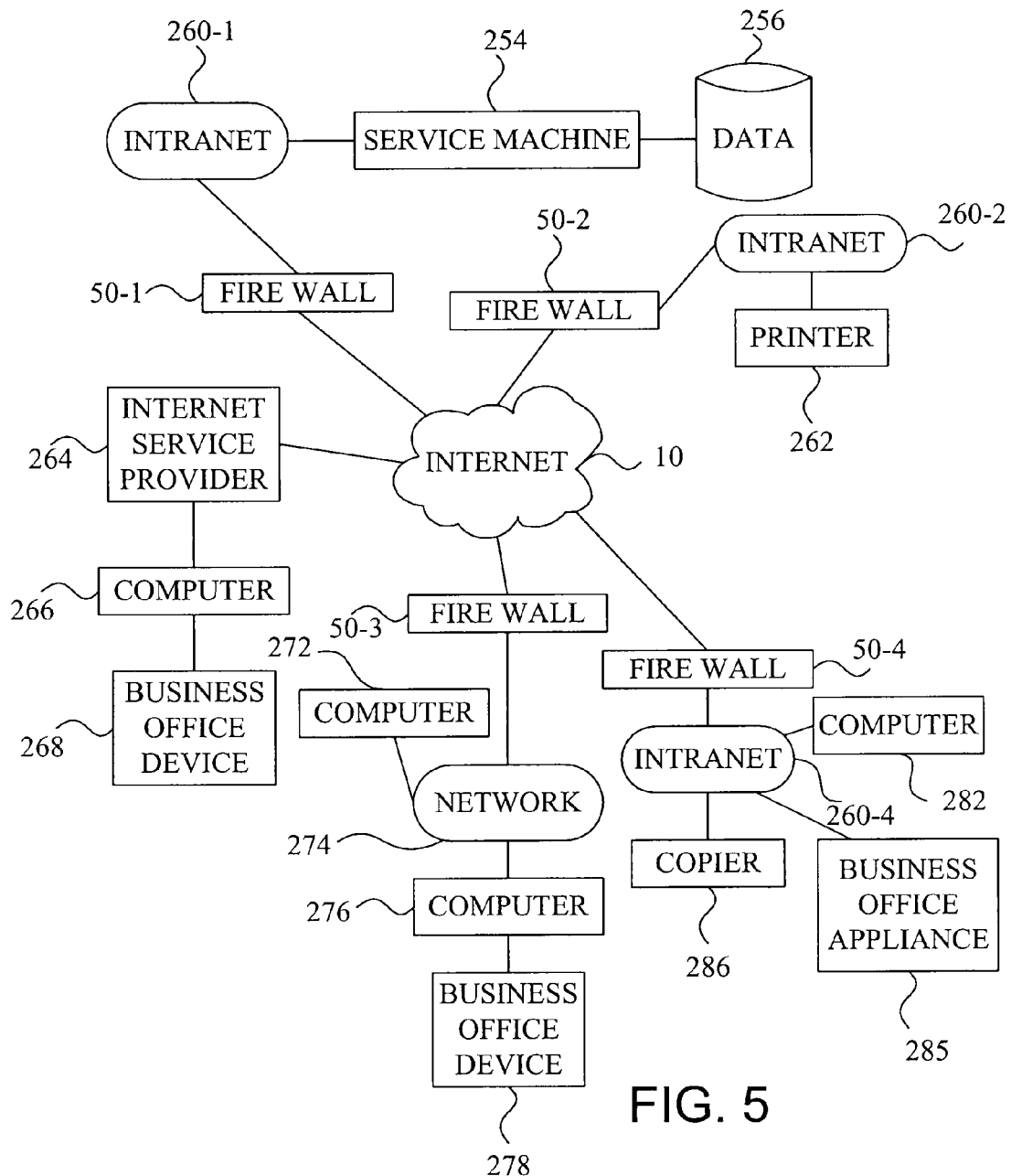
FIG. 5 illustrates an alternative system configuration in which business office devices are either connected directly to the network or connected to a computer which is connected to the network.

FIG. 5 illustrates an alternative system diagram of the invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein or has connected thereto data 256 which may be stored in a database format. The data 256 includes history, performance, malfunction, and any other information including statistical information of the operation or failure or set-up and components or optional equipment of devices which are being monitored. The service machine 254 may be implemented as the device or computer which requests the monitored devices to transmit data or which requests that remote control and/or diagnostic tests be performed on the monitored devices. The service machine 254 may be implemented as any type of device and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet service provider 264 which may be any type of Internet service provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an ISDN (Integrated Services Digital Network) line, ADSL (Asymmetric Digital Subscriber Line), modems which use frame relay communication, wireless modems such as a radio frequency modem, a fiber optic modem, or a device which uses infrared light waves). Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token-ring network). Networking software which may be used to control the network includes any desired networking software including software commercially available from Novell or Microsoft. The network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. In this embodiment, a computer 276 is connected between the business office device 278 and the network 274. This computer receives communications from the network and forwards the appropriate commands or data, or any other information, to the business office device 278. Communication between the business office device 278 and the computer 276 may be accomplished using wire-based or wireless methods including, but not limited to radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification 1.0A (available at the World Wide Web site http://www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable but optional equipment and therefore the invention may be operated without the use of firewalls, if desired.

Figure 6A:
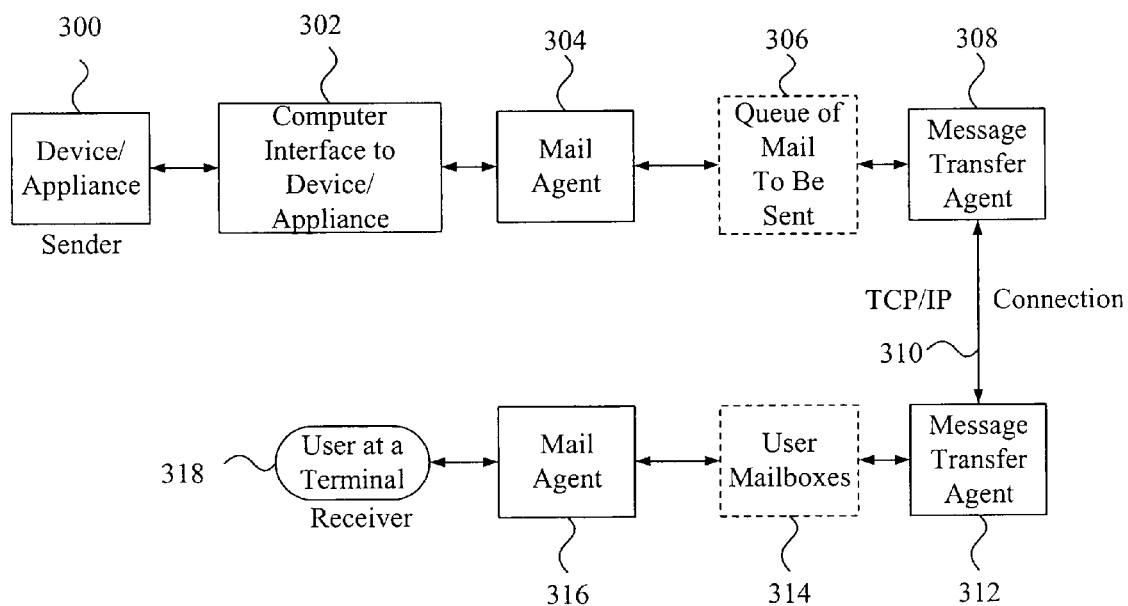
FIG. 6A is a block diagram illustrating a flow of information to and from an application unit using electronic mail.

FIG. 6A illustrates a device/appliance 300 connected to a typical e-mail exchange system which includes components 302, 304, 306, 308, 310, 312, 314, 316, and 318 which may be implemented in a conventional manner and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not be needed to interface with the device/appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may utilize any communication protocol. In the present invention, elements 302 and 304 of FIG. 6A reside in the library to monitor the application unit's usage.

From the message transfer agent 312, e-mail messages are stored in user mailboxes 314 which are transferred to the mail agent 316 and ultimately transmitted to the user at a terminal 318 which functions as a receiving terminal. The user at a terminal 318 may, e.g., be a Resource Administrator or a remote controller which may, e.g., be notified in the event of equipment failure.

This "store-and-forward" process relieves the sending mail agent 304 from having to wait until establishment of a direct connection with the mail recipient. Because of network delays, the communication could require a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include File Transfer Protocol (FTP) and HyperText Transfer Protocol (HTTP).

Public WANs, such as the Internet, are generally not considered to be secure. Therefore, messages transmitted over the public WANs (and multi-company private WANs) should be encrypted to keep the messages confidential. Encryption mechanisms are known and commercially available which may be used with the present invention. For example, a C++ library function, crypto, is available from Sun Microsystems for use with the Unix operating system. Other encryption and decryption software packages are known and commercially available and may also be used with this invention. One such package is Pretty Good Privacy (PGP) Virtual Private Network (VPN) available from Network Associates. Other VPN software is available from Microsoft Corporation.

Figure 6B:
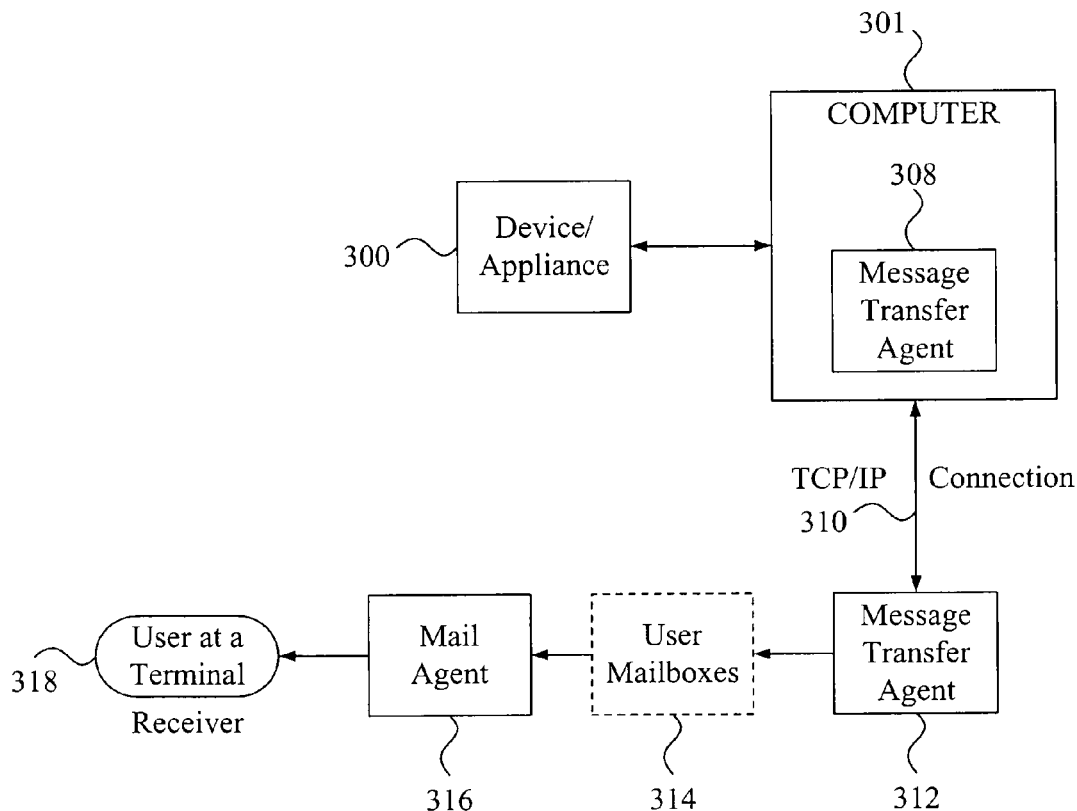
FIG. 6B illustrates an alternative way of communicating using electronic mail in which a computer which is connected to the application unit also serves as a message transfer agent.

As an alternative to the general structure of FIG. 6A, a single computer may be used which functions as the computer interface 302, the mail agent 304, the mail queue 306 and the message transfer agent 308. As illustrated in FIG. 6B, the device/appliance 300 is connected to a computer 301 which includes the message transfer agent 308.

Figure 6C:
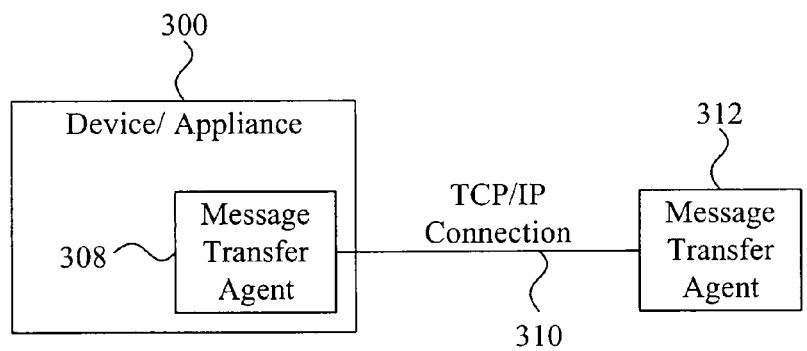
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 and has an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
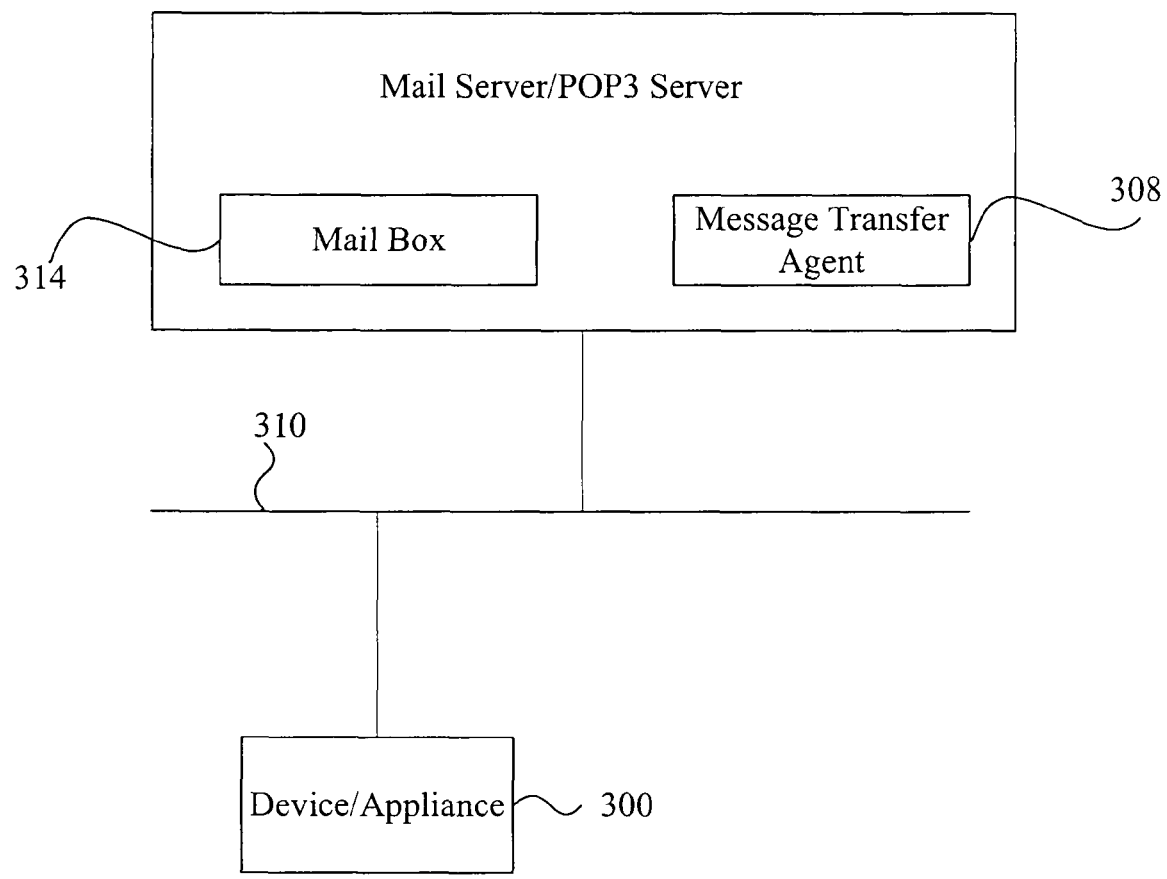
FIG. 6D illustrates an alternative way of communicating using electronic mail in which a mail server acts as a POP 3 server to receive mail for an appliance/device and as an SMTP server to send mail for the appliance/device.

FIG. 6D illustrates a system in which a device/appliance 300 does not itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
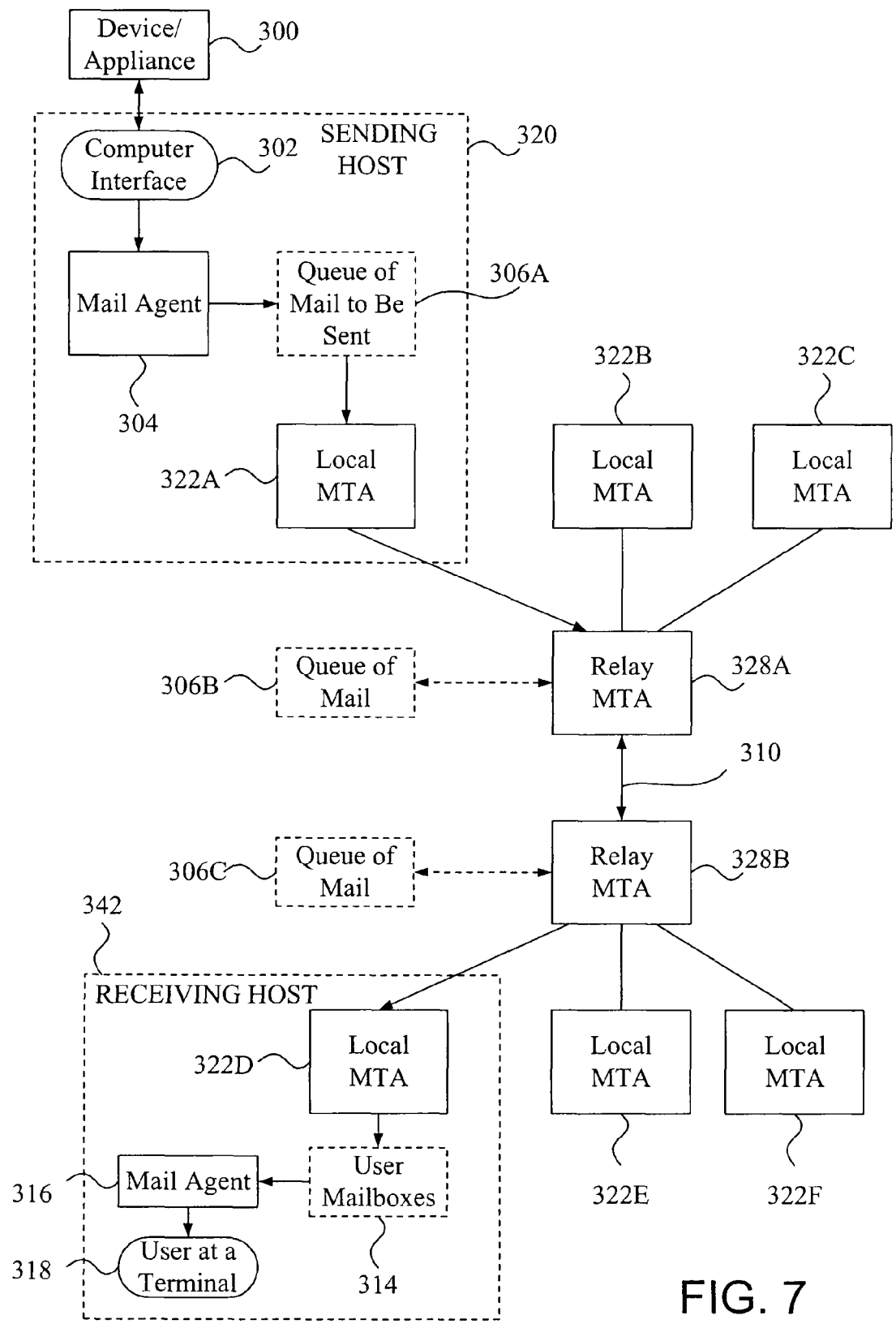
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction.

Figure 8:
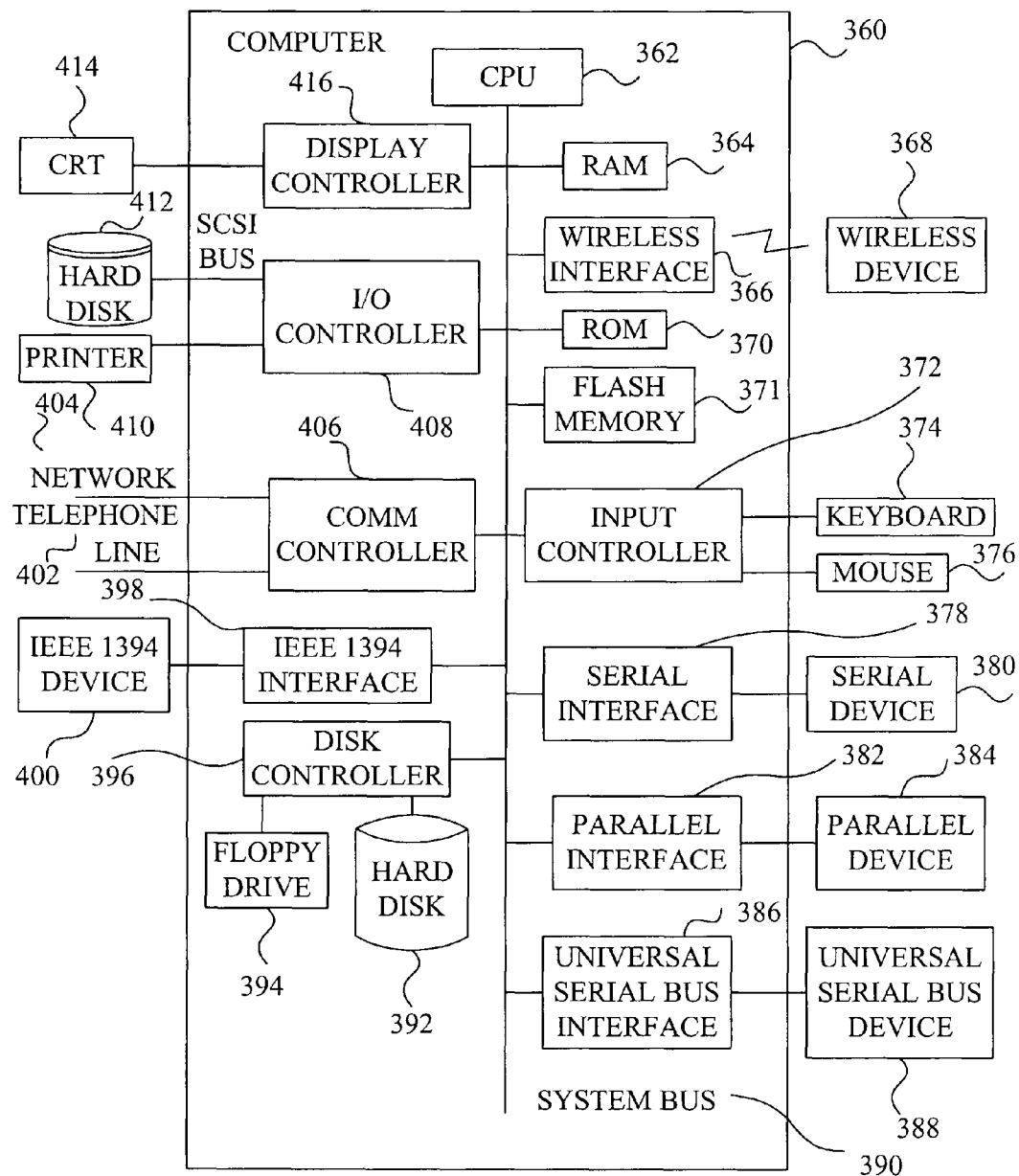
FIG. 8 illustrates an exemplary computer which may be connected to an appliance/device and used to communicate electronic mail messages.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of those computers. In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

There is a ROM 370 and a flash memory 371, although any other type of non-volatile memory (e.g., EPROM, or an EEPROM) may be utilized in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

One feature in the present invention is monitoring how a user uses a target application of an application unit. The term application unit in this instance refers to a system which a user interacts with and controls. The term target application refers to a user controlled system that controls the application unit. For example, an application unit may typically be a computer and a target application may then be a software program, e.g. a word processor, running on the computer which a user operates, for example by moving a pointer on a computer screen and "clicking" on certain command icons to cause the software program to perform certain functions. In this sense, an application unit in the present invention may refer to any of workstations 17, 18, 20, 22, 56, 62, 68, 74, 42 shown in FIG. 1 running a software program, the computer 301 shown in FIG. 6B running a software program, etc. An application unit may also refer to an image forming device such as any of the digital image forming apparatus 24, facsimile machine 28, and printer 32 in FIGS. 1 and 2. In this instance, each of these application units includes a user interface, such as operation panel 174 as shown in FIG. 3, which a user interacts with and utilizes to control the application unit. The present invention can monitor a user selecting controls on such an operation panel. As a further example, the application unit could also be an appliance, such as a microwave oven, with an operation panel. An application unit can also refer to any other device, including software, with which a user interacts, and in this case the target application may refer to only one feature of the software with which the user interacts.

Another feature of the present invention is monitoring the user's usage of such a target application of an application unit, and communicating data regarding the monitored usage. This data will typically be transmitted by electronic mail by the computer interface 302 of FIG. 6A, or the computer 301 of FIG. 6B or the device/appliance 300 of FIG. 6C. This data regarding a user's usage of a target application of an application unit can then be utilized in many ways, for example in improving software development, in monitoring usage of a device (e.g., an image forming device), discovering user difficulties with appliances and software, and determining most frequently used features of application units.

Figure 9:
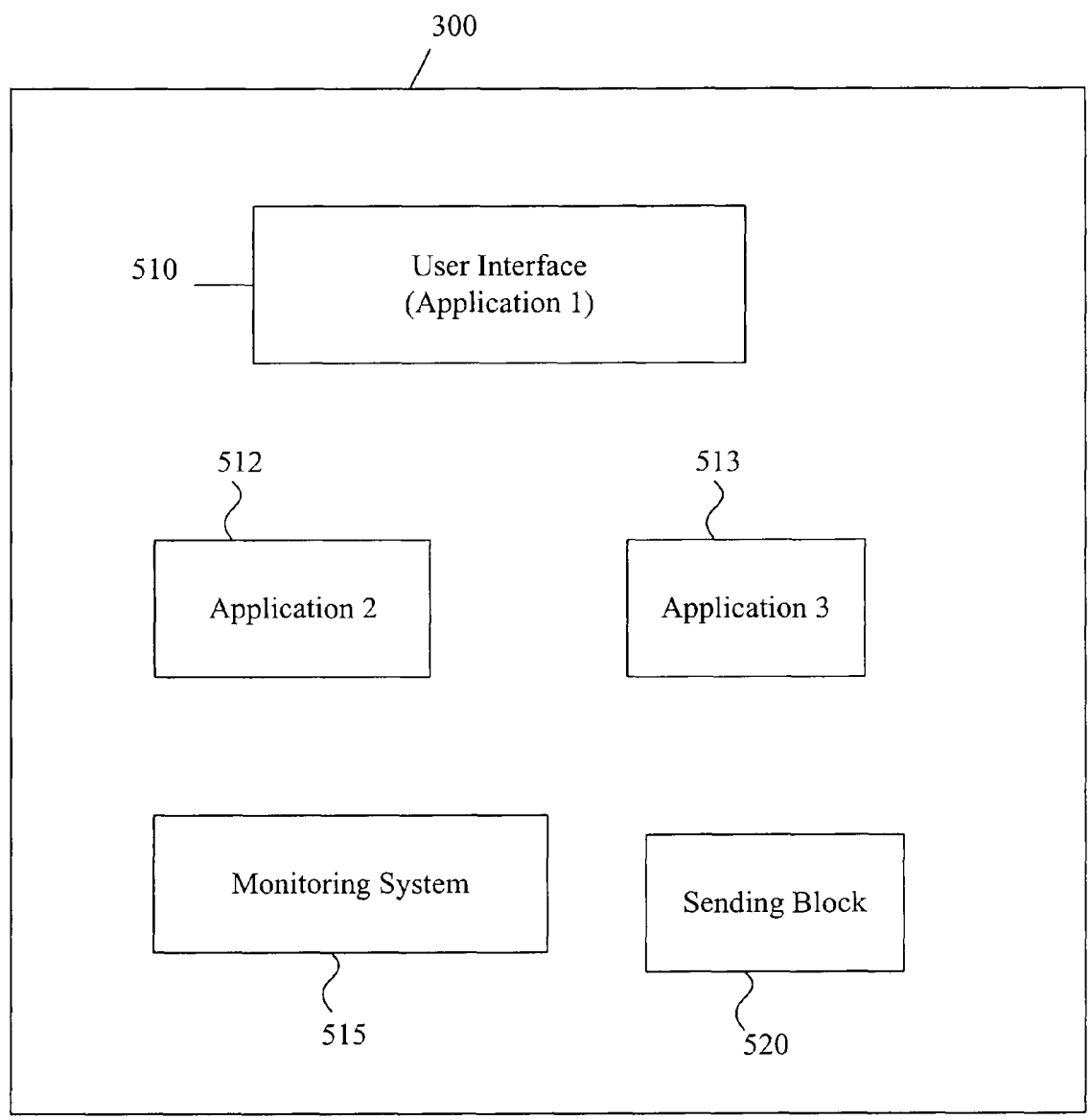
FIG. 9 is a block diagram illustrating connections between a monitoring and logging subsystem, a communications subsystem and a target application of an application unit in the present invention.

FIG. 9 illustrates various exemplary elements of the present invention. More particularly, FIG. 9 shows a device/appliance 300 including target applications 510, 512 and 513. The user interface 510 is an interface for a user to control the appliance or device. As discussed above, in one common instance, the target application may be a software program running on one of the workstations 17, 18, 20, 22 as shown in FIG. 1. In this instance, the user interface 510 may be a display on a monitor of one of these workstations. In such a case, a monitoring system 515 may, e.g., monitor the user behavior of clicking a selected menu. As another exemplary application, the device/appliance 300 may be a copier and application 2, element 512, may be an application for sorting multiple copies. Both user interface 510 and application 2, element 512, would send event messages to the monitoring system 515 to be logged.

The monitoring system 515 is implemented either only in hardware or using a combination of hardware and software where the combination includes at least one computer readable medium. Examples of computer readable media include, but are not limited to, compact discs 119, hard disks 112, floppy disks, tape, magneto-optical disks, PROMs (EPROM, EEPROM, Flash EPROM), DRAM, SRAM, SDRAM, magnetic or optical cards, or any type of media suitable for storing electronic information.

Stored on any one or on a combination of computer readable media, the present invention includes software for controlling both the hardware and for enabling the system to interact with a human user. Such software, in the form of computer code devices, may include, but is not limited to, device drivers, operating systems and user applications, such as development tools. Such computer readable media further includes the program product of the present invention for monitoring and controlling an application unit. The computer code devices of the present invention can be any interpreted or executable code mechanism, including but not limited to scripts, interpreters, dynamic link libraries, classes (e.g., Java or C++), packages (e.g., Java or C++) and complete executable programs.

Another illustrative embodiment of FIG. 9 is an office device such as a digital copier where application 1, element 510, is the user interface discussed previously. Application 2, element 512, is a software error tracking system to monitor internal error conditions of the software system. Application 3, element 513, is a mechanical error tracking system to monitor mechanical error conditions such as jam and toner out. All of the applications use the monitoring system 515 and a sending block 520. As a further example, and as noted above, the device/appliance 300 may be an image forming device such as the digital image forming apparatus 26, facsimile machine 28, or printer 32 shown in FIG. 1. In this instance, the user interface 510 may take the form of an operation panel (e.g., operation panel 174 as shown in FIG. 3) with a plurality of keys and/or a touch screen which a user operates to control the image forming device. When the device/appliance 300 as shown in FIG. 9 is an image forming device with a user interface 510, the present invention can monitor the commands that a user selects. It is to be noted that the device/appliance may be any monitored device such as utilities and parking meters or any monitored appliance such as a microwave oven, VCR, digital camera, cellular phone, palm top computer, etc.

At a designated time, the logged data of the events is then sent to the sending block 520, which then communicates such monitored event data to a designated party. The monitoring system 515 may be a monitoring and logging DLL which can be implemented in the device including the device/appliance 300 or in another system control element. The protocol processing system may also be implemented in the device including the application unit or device/appliance 300 as shown in FIG. 6C, or may also be implemented, as shown in FIG. 6B, in a computer 301 to which the application unit or device/appliance 300 is attached. The present invention may also take the form of computer control codes recorded on a computer readable medium.

Figure 10:
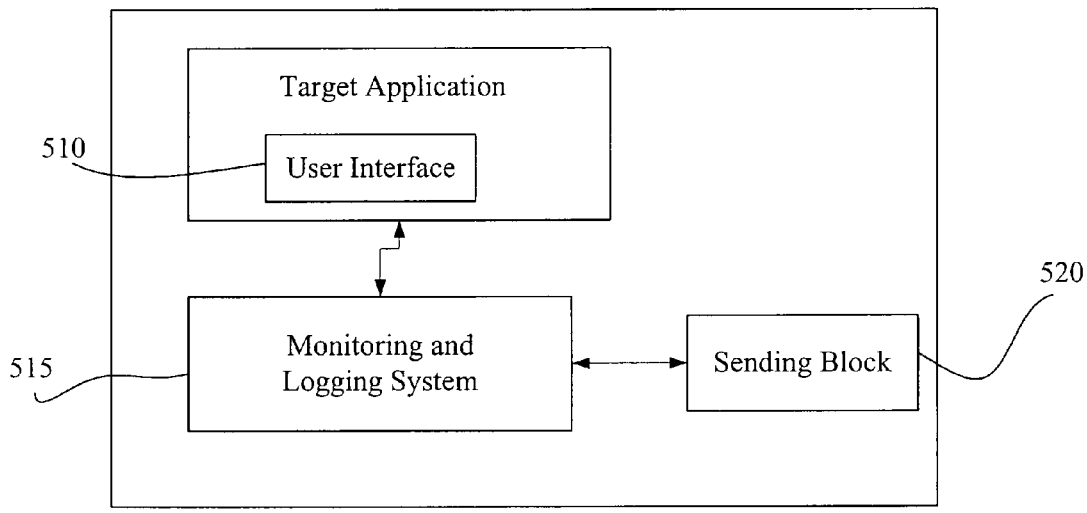
FIG. 10 illustrates a first example of an application unit to which the present invention can be applied.

FIG. 10 shows an example wherein the user interface 510 of a target application is monitored. For example, the target application can be a word processor where a user behavior of clicking the menu is of interest. Monitoring and Logging System 515 can monitor each instance of clicking of menu items. At the end of the task, the monitored data can be sent through the Sending Block 520.

Figure 11:
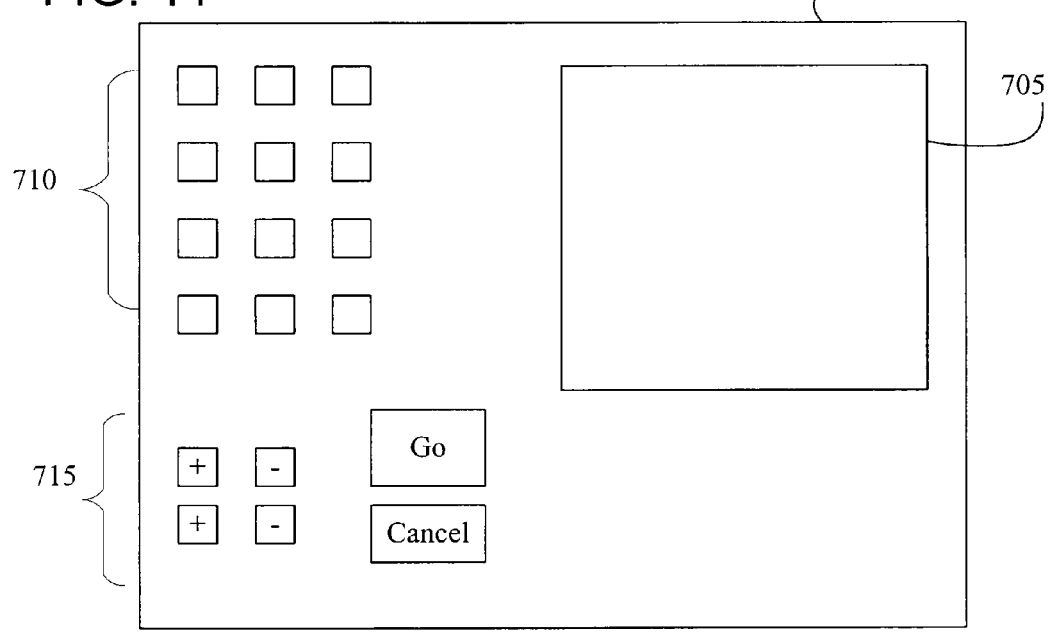
FIG. 11 illustrates a second example of an application unit to which the present invention can be applied.

One illustrative embodiment of such a user interface 510 used with a digital image forming apparatus 26, facsimile machine 28, or printer 32 is shown in FIG. 11. In this embodiment, the present invention monitors each time a user presses one of the control buttons on the operation panel and logs the usage data of such a user's usage for subsequent communication.

As shown in FIG. 11, an operation panel 700 includes a touch screen 705 on which various commands appear which an operator selects by touching different portions of the touch screen 705. The operation panel 700 also includes a 10-key pad 710 and various other control buttons 715. In the case of an image forming device, the control buttons 715 may be commands for, e.g., selecting a paper size, changing a magnification, changing a darkness of a desired image, etc.

When the device/appliance 300 in FIG. 9 is an image forming device and the user interface 510 corresponds to the operation panel 700 as shown in FIG. 11, the present invention can monitor the commands shown in FIG. 11 that a user selects. The operation panel 700 shown in FIG. 11 may, with modifications, also be an operation panel for a user-controlled appliance such as a microwave oven, VCR, digital camera, cellular phone, palm top computer, etc.

FIGS. 10 and 11 illustrate examples of the device/appliance 300 and user interface 510 of FIG. 9 to which the present invention can be applied. As would be readily apparent to those of ordinary skill in the art, the present invention is directed to various types of application units including various types of user interfaces. The present invention is applicable to any device to be monitored which includes a user interface.

The present invention may be implemented using object-oriented technology, which is based upon the manipulation of software objects instantiated from software classes. A software class is considered as a user defined type equivalent to normal types such as integer type. The software class is typically declared with data items and procedures or software methods that operate on the data items. Many high-level languages, including C++, support the declaration of a class. Software objects instantiated for software classes are called instances of the software classes from which they are instantiated, and have all the features, or the "type" of the software class used for instantiation.

An abstract class is a software class that is not intended to be instantiated. The purpose of an abstract class is to define interfaces shared by derived classes through inheritance. An abstract class is frequently used with virtual functions or software methods which declare the interfaces with or without definitions. When a software class derived from an abstract class defines an inherited virtual function of the abstract class, the virtual function of the derived software class will be executed even when the instantiated object of the derived software class is accessed through a reference type of the base abstract class. If the function referenced is not a virtual function, the base class function or software method will be executed. This technique allows the client or user of the software object to execute the correct function or software method with only the knowledge of the abstract class. Many examples of such techniques are shown in Gamma, E., Helm, R., Johnson, R. and Vlissides, J., *Design Patterns: Elements of Reusable Software*, Addison-Wesley, Massachusetts, 1995, which is incorporated herein by reference in its entirety.

Object-Oriented Programming ("OOP") is a programming methodology in which a program is viewed as a collection of discrete objects that are self-contained collections of data structures and routines that interact with other objects. As discussed above, a class has data items, structures, and functions or software methods. Data items correspond to variables and literals of prior programming art. Structures are named groupings of related data items and other structures. Software methods correspond to functions and subroutines of prior programming art. An object-oriented framework is a reusable basic design structure, comprising abstract and concrete classes, that assists in building applications.

Pointers used for accessing specific objects, data items, and software methods are data items which include values of system equivalents of absolute addresses in computer memory. Null pointers, or zero pointers, are pointer variables or literals which have been assigned a system value, for example, zero, denoting that a specific pointer is currently pointing to a null or non-existent item. References and reference variables are generally data items which have values of system equivalents of absolute addresses in computer memory. In programming terminology, dereferencing a reference means accessing information at the computer memory address referenced by a pointer or reference.

A compiler is a software program that translates programs written in a high-level language, such as C++ or Pascal, into an intermediate language or machine language which is specific to a particular computer system configuration. In general programming terminology, data items, variables, and functions or software methods are declared so that a compiler knows specific names the programmer will use in the high-level language code to be translated. A compiler typically creates a symbol table to keep track of valid data items, variable names, function or software method names, structures, and addresses thereof as space is allocated. This process enables the compiler to assign numeric addresses to references to the data items, variables, functions or software methods, or software structures, or to create executable code to enable referencing of the data items, variables, functions or software methods or software structures during execution of the executable code that is output from the compilation process. For purposes of this invention, a declaration of a data item, variable, function, or software method is a declaration of the name of the data item, variable, function, or software method. A definition of the data item, variable, function, or software method is the defining content for the data item, variable, function, or software method. For example, the declaration of a software method named "draw" includes the name and types of interfaces for the software method, but not the defining code. The definition of the software method named "draw" includes the name of the software method, any needed data type information, information concerning parameters to be passed, and the defining code for the software method. In some programming languages, a definition is also a declaration.

The three main features of object-oriented programming are inheritance, encapsulation, and polymorphism. Encapsulation and polymorphism have already been described and are already well known in patents relating to object-oriented systems. Inheritance allows a programmer to establish a general software class with features which are desirable for a wide range of software objects. For example, if a programmer designs a software class shape having certain generalized features such as a closed convex shape and a generalized computable property called "draw," it is then possible to construct subclasses derived from the superclass shape such as triangles, squares and circles, all having the shared properties of the parent class shape, with additional properties such as the lengths of sides or a radius value. It is also possible, for example, to have derived subclasses of classes which have additional properties such as a solid circle and a dashed circle.

The class shape is considered a base class, in that instantiations of actual objects is performed in its subclasses. The class shape is also considered an abstract class, in that it makes no sense to instantiate a shape object since object properties are not fully defined for the class shape. An abstract class is a class from which no objects are instantiated, and for which an interface for subclasses is established. The class shape establishes certain properties inherent to all shape subclasses for inheritance purposes. For example, an operation named "draw" of a shape, a commonly requested operation among users of shapes, can be declared as a software method for the class shape, to be inherited in all subclasses of the class shape. A programmer creates new classes derived from the class shape which inherit all desired features of the class shape without rewriting code already written for the class shape. This feature, called reusability, offers tremendous savings of time and resources in system development, maintenance, and support.

In many high-level programming languages, a programmer declares a derived class by providing the name of the class being declared and the names of base classes from which the derived class is to inherit properties. In the shape example discussed previously, the class shape is considered to be at a top level of an inheritance hierarchy, and is abstract since it makes no sense to instantiate shape objects with no definition of an actual shape, for example a square or a circle. Subclasses declared a level below the class shape are the subclasses specifically derived from the class shape, such as triangles, squares and circles. The subclasses triangles, squares and circles are then called children or subclasses of the class shape, and the class shape is called a parent or superclass of the classes triangles, squares and circles. Declarations of the subclasses specifically refer to the class shape for establishing inheritance. Subclasses a level below the class circle are the subclasses specifically derived from the class circle, such as solid circle and dashed circle. The classes solid circle and dashed circle are then called children or subclasses of the class circle, and the class circle is called a parent or superclass of the classes solid circle and dashed circle. Declarations of these subclasses specifically refer to the parent class circle for establishing inheritance. Since the class circle is derived from the class shape, the derived classes solid circle and dashed circle inherit all features of the class shape, and all additional features of the class circle.

In object-oriented programming, a pure virtual function is a function or software method declared with no defining code in an abstract class. For example, in declaring the abstract class shape described previously, a programmer declares a pure virtual function named "draw," with no defining code, as a software method for the abstract class shape. Subclasses derived from the abstract class shape inherit the pure virtual function as a virtual function having the same name as the pure virtual function of the parent abstract class. The function name or software method name has executable code defined at some level in subclasses of the parent abstract class.

For the shape example discussed previously, assume the abstract class shape has a declaration for the pure virtual function named "draw." Using formulas from basic algebra and geometry, the actual code executed for drawing a shape differs from one shape to another, so the code for the function named "draw" is defined only in derived base classes used for instantiation of software objects. In C++, the virtual function is declared as a virtual function in all abstract subclasses to be used as superclasses for derived subclasses from which objects are to be instantiated with defining code for the virtual function of the abstract classes. For example, drawing a circle requires plotting points equidistant from a center point. Drawing a square generally requires plotting points to form four straight sides having equal length which are connected at right angles. Therefore, a request to draw a particular shape needs to accommodate the different properties of various desired shapes. Using a pure virtual function named "draw" in the abstract class shape, the code for drawing a circle is included as a software method named "draw" for instantiated circle software objects, and the code for drawing a square is included as a software method named "draw" for instantiated square software objects. A reference to a software object instance of the software method named "draw" causes execution of the code to draw the shape represented by the software object instance. For this example, the shape of a circle is drawn if the code for an instantiated circle object is accessed, and a square is drawn if the code for an instantiated square object is accessed.

In C++, the code for the desired software method named "draw" is accessible by using a format including a reference to the desired circle or square instantiated software object and the name "draw." A comprehensive discussion of the pure virtual function property of abstract classes in C++ is provided in Stroustrup, B., *The Design and Evolution of C++*, Addison-Wesley, Massachusetts, 1994, in Stroustrup, B., *The C++ Programming Language Special Edition*, Addison-Wesley, 2000, and in Meyers, S., *Effective C++: 50 Specific Ways to Improve Your Programs and Designs*, Addison-Wesley, Massachusetts, 1992, all of which are incorporated herein by reference in their entirety.

Some object-oriented programming languages support multiple inheritance, wherein a software class derived from plural existing parent software classes inherits attributes and software methods from all parent software classes included in the desired derivation. As discussed above with regard to inheritance, a child subclass is declared by supplying the name of the class to be declared, and the names of the desired parent base classes for multiple inheritance. Additional properties for the child subclass are then declared and/or defined.

A comprehensive discussion of OOP is provided in Coad, P. and Yourdon, E., *Object-Oriented Analysis, Second Edition*, Prentice-Hall, Inc., New Jersey, 1991, and in Booch, G., *Object-Oriented Analysis and Design with Applications, Second Edition*, Addison Wesley Longman, Calif., 1994, which are incorporated herein by reference in their entirety.

Figure 12A:
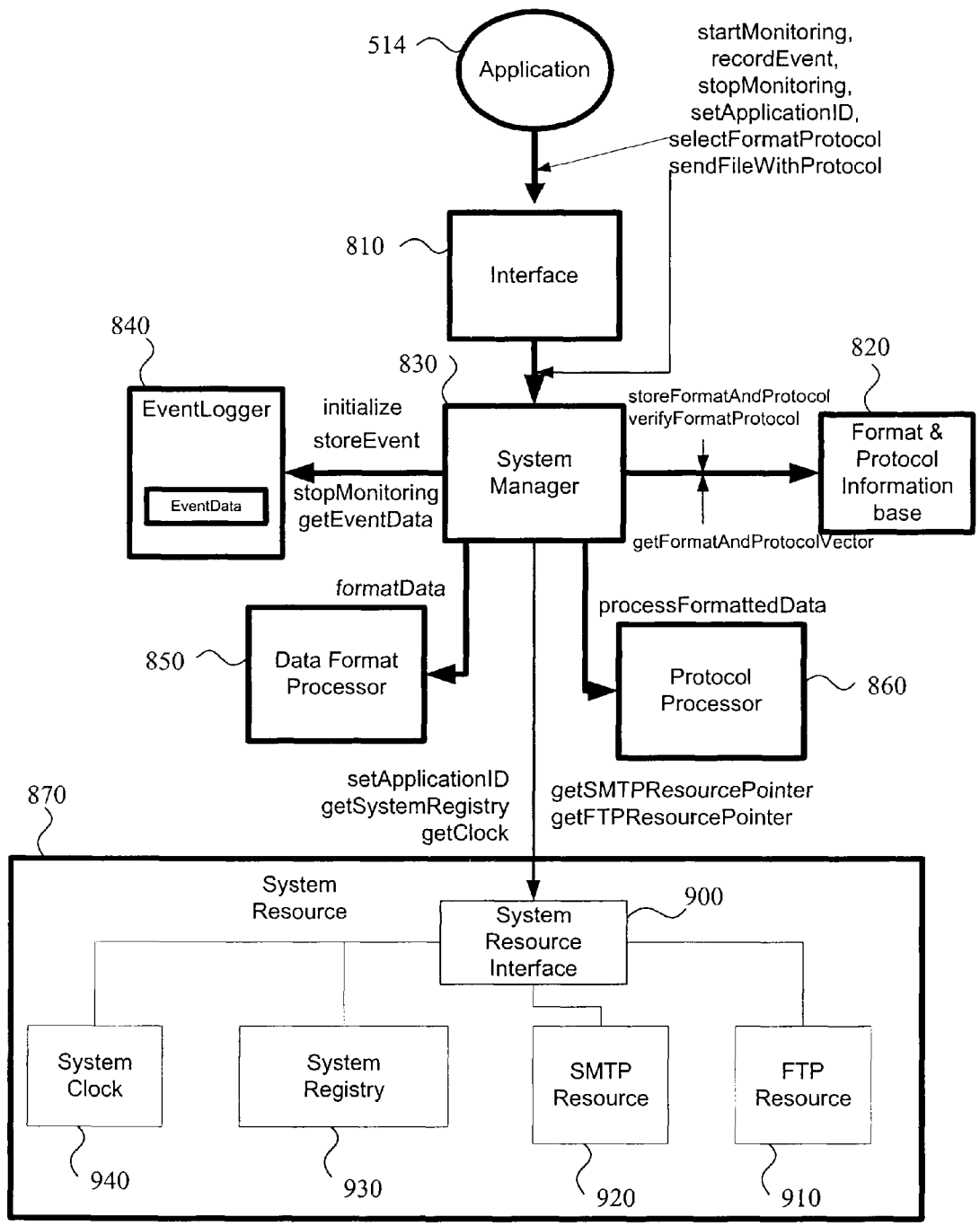
FIG. 12A illustrates an exemplary general architecture of the system.

FIG. 12A illustrates an exemplary general event management architecture of the system that can be implemented as, e.g., any one, or a combination of, a dynamic linked library (DLL), a script, a Java or C++ class, a C library or routine, etc. The remainder of this discussion describes the implementation in terms of a DLL, although this discussion is not intended to limit the scope of the invention to a DLL.

In general, an application 510, 512, 513 as shown in FIG. 9 or an application 514 of FIG. 12A communicates through an interface 810. The interface 810 specifies the Application Programming Interface (API) for the system management architecture (e.g., how information is passed via a C++ function call to the software object(s) in a system manager 830 with the same names). The functions to be used by the software application may be declared as follows:

1. void setApplicationID(char *): The software application calls this function to inform the monitoring DLL of the name of the software application that is using it. The input to this function is a string representing the name of the software application using the DLL. The monitoring DLL maintains the information regarding the name of the software application that is using it. For example, if the software application is Microsoft Word, then the string "MS Word" may be used to identify the software application.
2. void startMonitoring( ): The software application calls this function to inform the monitoring DLL to start monitoring the usage of the software application. The monitoring DLL obtains and maintains the following information: user ID, cumulative number of sessions, and start time.
3. void recordEvent(char*): The software application calls this function to inform the monitoring DLL to record a character string passed as data type pointer to data type char (i.e., char *) with the time elapsed from the start time. The monitoring DLL will maintain information regarding the character string and time elapsed.
4. void stopMonitoring( ): The software application calls this function to inform the monitoring DLL that the software application is terminating. The monitoring DLL obtains and maintains the duration of the execution of the software application. The monitoring DLL then sends the usage information using specified data format(s) with specified communication protocol(s).
5. void selectFormatProtocol (int format, int protocol): The software application calls this function to inform the monitoring DLL which data format and communication protocol should be used to send the data. The values indicating specific data formats are specified in Table 1 shown below and the values indicating specific communication protocols are specified in Table 2 shown below.
6. void sendFileWithProtocol (char*Path, char*FileName, int format, int protocol): This interface specifies a file which may contain any data including the monitored event data or system log to be sent using the specified communication protocol. The last two parameters, format and protocol are specified as above. The format of this example, however, accepts only values of 1 (text) or 5 (binary). If a format value of 10 or 20 is used, it is converted to 5 (binary). The intended use of this function is to enable other processes to monitor and format the data while using the DLL to send the data to the desired destination after calling the setApplicationID( ) function discussed above.

A system manager computer code device 830 of FIG. 12A manages the behavior of other computer code devices by using appropriate software objects and their functions.

When the interface 810 receives an application ID through the interface function setApplicationID( ) as described above, the system manager 830 passes the information to a system resource interface 900 of a system resource 870 that in turn passes the application ID information to a system registry 930 to be stored.

An event logger 840 records relevant information such as user ID, application ID, cumulative session number, start time, duration and sequence of events with the elapsed times when requested through the system manager 830. The event logger 840 supports functions including: initialize( ), storeEvent( ), stopMonitoring( ), and getEventData( ).

The initialize( ) function receives a reference to the system resource interface 900 of the system resource 870. The system manager 830 calls the initialize( ) function when startMonitoring( ) is called by the application 514. The initialize( ) function passes, to the event logger 840, the reference to the system resource interface 900. The reference to the system resource interface 900 allows access to the system registry 930 to obtain the application ID and to a system clock 940. The event logger 840 handles the cumulative number of usages, reads the clock to store the start time in order to compute the elapsed time and duration, and sets up the user information by examining the registry.

After initialization, the storeEvent( ) function can be called with a string parameter for the event passed by record Event( ). The event logger 840 stores the event string and the elapsed time from the start time (recorded during the initialize( ) function call).

After the application 514 has completed its usage monitoring, it calls the stopMonitoring( ) function so that the duration can be computed. If multiple sessions are stored, this function stops the recording of a corresponding session.

In this example, the elapsed time is the time from the startMonitoring( ) function call to the recordEvent( ) function call where there can be more than one elapsed time interval in one monitoring session. The duration is the amount of time measured from the startMonitoring( ) function call to the stopMonitoring( ) function call. In order to compute elapsed time and duration, the system tracks the starting time internally and computes the difference between the starting time and the function calling time.

The function selectFormatProtocol( ) specifies the data format to be used to describe the monitored event data and the protocol to send the data to the destination. Table 1 describes the data format values and Table 2 describes the communication protocol values.

TABLE 1

Format Values and definitions

| Format Name | Format Value | Comments |
| --- | --- | --- |
| Text | 1 | Plain text with no particular formatting. This format is for the sendFileWithProtocol( ) interface. Monitoring of events should not use this format. If a monitoring function uses this format, the data format is interpreted as Comma Separated Format (10). |
| Binary | 5 | Default for sending a file. Binary encoding. This format is for the sendFileWithProtocol( ) interface. Monitoring of events should not use |

TABLE 1-continued

Format Values and definitions

| Format Name | Format Value | Comments |
|---|---|---|
| | | this format. If a monitoring function uses this format, the data format is interpreted as Comma Separated Format (10). |
| Comma Separated Format | 10 | Default for monitoring. For the interface sendFileWithProtocol( ), the value is changed to 5. |
| XML Format | 20 | For the interface sendFileWithProtocol( ), the value is changed to 5. |

TABLE 2

Protocol Values and Definitions

| Protocol | Protocol Value | Comments |
|---|---|---|
| Local Disk | 1 | Local Disk Save. Default for monitoring |
| SMTP | 10 | Mail Body text/plain us-ascii. For a binary format, the communication protocol value is converted to 30. |
| | 30 | MIME application/octet-stream, base64. |
| FTP | 100 | Text. For a binary format, the communication protocol value is converted to 105. |
| | 105 | Binary. Default for sending a file. |

The eventlogger 840 also provides access to a getEvent Data( ) function. If the stopMonitoring( ) function was not previously called (i.e., the current session's duration field is undefined), the monitoring is stopped by calling the stopMonitoring( ) function. The stopMonitoring( ) function computes the duration of the current session. The getEventData( ) function returns an abstract class with access functions as shown in FIG. 12B. The abstract class facilitates extensions for multiple sessions.

As discussed above, FIG. 12B shows the interface functions of the abstract class EventData returned by the function getEventData( ). The interface function of the abstract class EventData preferably describes what the function should do but does not provide the method to perform that function. The classes which are derived from the abstract class EventData preferably provide the method to perform those functions. Thus, when the function getEventData( ) returns an abstract class EventData, it is actually returning a class derived from the abstract class EventData which will provide the method for the interface functions. When the interface functions of the abstract class EventData are used, it is actually the interface functions of the derived class of the abstract class EventData that are used. However, it does not matter to the user of the abstract class EventData which derived class is being used. This allows flexibility for the representation of the abstract class EventData.

When the sendFileWithProtocol( ) function is called a specified file is sent through either SMTP or FTP after being formatted by the data format processor 850 and by protocol processor 860 that uses an SMTP resource 920 and an FTP resource 910 in the system resource 870. In some cases, the user has an option to save the file in a specified local disk. The values in Tables 1 and 2 are used to describe the file attribute or data format and communication protocol used to send the file.

The format and protocol information base system 820 (implemented as any one or a combination of package, DLL, static library, etc.) stores the data format and communication protocol information and checks the combination of formats and protocols to determine valid combinations, and sets the values to correct values or default values when the passed data are not correct. To facilitate the storage process, the storeFormatAndProtocol( ) function accepts two parameters (i.e., one for data format and one for communication protocol).

The format and protocol information base system 820 also includes a getFormatAndProtocolVector( ) function which returns a data format and associated vector of communication protocols. The getFormatAndProtocolVector( ) function is mainly used for sequence monitoring. The returned value is a boolean value where a value of true indicates that valid parameters were returned and a value of false indicates that no more data is available. The returned parameters are of data types int and vector of int. The first returned parameter of data type int refers to the data format while the second returned parameter of data type vector of int refers to the vector of communication protocols for the data format. When there is no selectFormatProtocol( ) function call, the getFormatAndProtocolVector( ) function returns the default setting. As would be evident, other collections or lists (e.g., a list template) may be used in place of a vector.

Sending the file involves using the function verifyFormatProtocol( ) of the interface 810. The verifyFormatProtocol( ) function checks the combination of the data format and communication protocol. If the combination is not determined to be valid, the system automatically changes the values to an acceptable combination.

The data format processor 850 formats the data into a specified data format which is derived from an abstract class format. One exemplary function is the formatData( ) function that receives a pointer to the abstract class EventData or two strings. The returned value is a pointer to an abstract class FormattedData. The interface to a FormattedData abstract class is defined as in FIG. 12C.

As discussed above, FIG. 12C shows the interface functions of the abstract class FormattedData returned by the function formatData( ). The interface function of the abstract class FormattedData preferably describes what the function should do but does not provide the method to perform that function. The classes which are derived from the abstract class FormattedData preferably provide the method to perform those functions. Thus, when the function formatData( ) returns an abstract class FormattedData, it is actually returning a class derived from the abstract class FormattedData which will provide the method for the interface functions. When the interface functions of the abstract class FormattedData are used, it is actually the interface functions of the derived class of the abstract class FormattedData that are used. However, it does not matter to the user of the abstract class FormattedData which derived class is being used. This allows flexibility for the representation of the abstract class FormattedData.

The protocol processor 860 outputs the formatted data through the specified communication protocol. In one embodiment, the protocol processor 860 also encrypts the body of the message. To output the data, a processFormattedData( ) function is called with an input pointer to the abstract class FormattedData and a reference to the system resource interface 900. The processFormattedData( ) function returns a boolean value where a value of true indicates no errors, and a value of false indicates the existence of an error while processing the formatted data.

The components of the system resource 870 supply important information shared by the various components of the monitoring process and persistent information across the execution of the DLL. Some of the important information is timer information provided through the system clock 940. The system registry 930 for recording necessary information which is required to send out the monitored information is another component of the system resource 870. Many registry entries are set up at installation time. An exemplary structure for the registry is:

HKEY_LOCAL_MACHINE—SOFTWARE—RicohMonitor—XXX(ApplicationID)

In this exemplary structure, XXX represents the application ID, and the following variables are placed in the registry under the XXX tree: CumulativeUsage, Local Directory, UserID, SMTP Server, Recipients, From, FTP Server, FTP User, FTP Password, FTP Target Path etc. In a preferred embodiment, CumulativeUsage is an integer, and the rest of the variables are strings.

Figure 13A:
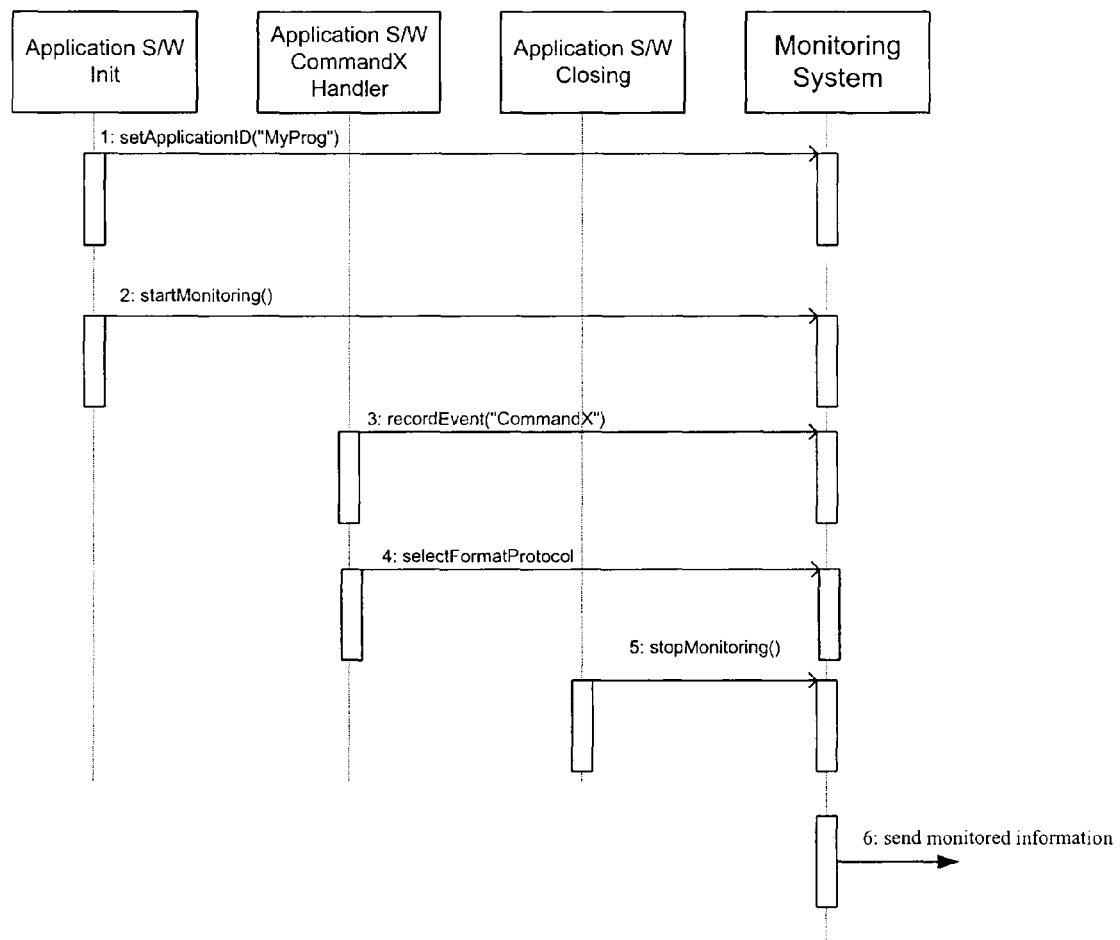
FIG. 13A illustrates an exemplary calling sequence of the interface functions from application software within an application unit, appliance or device when a sequence of events are monitored.

FIG. 13A illustrates an exemplary calling sequence of various computer code devices according to the present invention when the sequence of events is monitored. The application software sets up the application ID and starts the monitoring computer code device. When an event to be monitored occurs, the application sends a message to the monitoring computer code device with the event name so that the monitoring computer code device will track the name of the event and the timing. When the application no longer needs to monitor any activities, the application sends a command to select the format and protocol to be used to send the monitored information. The application then calls the stopMonitoring( ) function, either explicitly or implicitly, as described below.

More specifically, FIG. 13A illustrates a calling sequence of the interface functions from application software within an application unit, appliance or device when a sequence of events are monitored. The application software may be, e.g., element 512 or 513 discussed previously with regard to FIG. 9 or element 514 as discussed previously with regard to FIG. 12A. In step 1, the application software calls the function setApplicationID( ) to send the name of the software application to the monitoring DLL. In step 2, the application, e.g., 514 calls the function startMonitoring( ) to inform the monitoring DLL to start monitoring the usage of the software application 514. In step 3, upon the occurrence of an event, the application 514 calls the function recordEvent( ) to inform the monitoring DLL to record the event and time elapsed from the start time. In step 4, the application 514 calls the function selectFormatProtocol( ) to inform the monitoring DLL which data format and communication protocol should be used to format and send data regarding the monitoring of the application 514. In step 5, upon closing the application 514, the application 514 calls the stopMonitoring( ) function to inform the monitoring DLL that the software application 514 is terminating. As indicated previously the monitoring DLL obtains and maintains the duration of the execution of the software application 514. In step 6, the monitoring system (i.e., the monitoring DLL) sends the monitored usage information to a specified destination.

Although FIG. 13A describes sending the monitored information each time an application stops monitoring, in an alternate embodiment, information is sent only upon a secondary event happening (e.g., elapsed time or after a number of events or monitoring sessions have occurred). Also, the protocol includes saving the monitored information in a local storage medium, such as a hard disk.

Figure 13B:
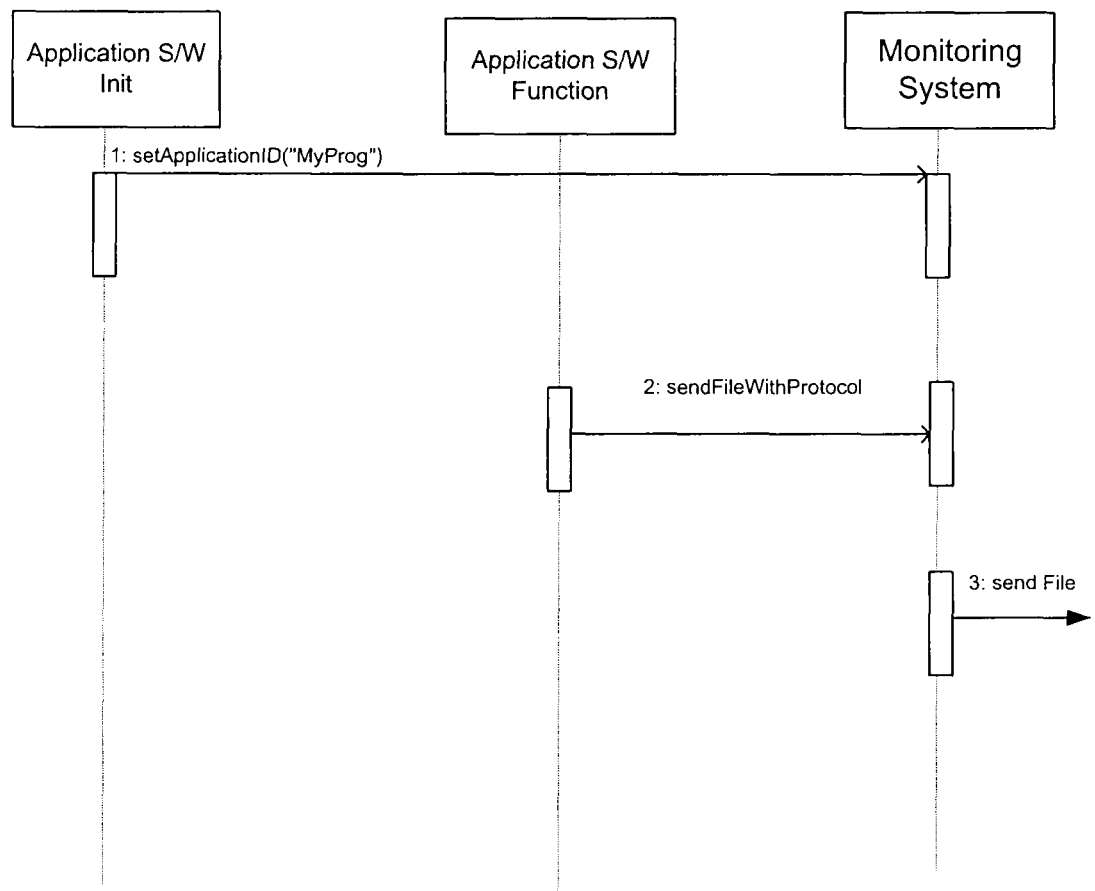
FIG. 13B illustrates an exemplary calling sequence of the interface functions from application software within an application unit, appliance or device when a file is sent.

FIG. 13B illustrates an exemplary calling sequence of various computer code devices according to the present invention when the file which may contain any data including the monitored event data or system log is sent. In step 1, the application software 514 sets up the application ID by calling setApplicationID( ) as discussed with regard to FIG. 13A. At a certain time, in step 2, the application software function calls the sendFileWithProtocol( ) function with the file location, data format, and communication protocol to be used. In step 3, the monitoring system sends the file.

Figure 14:
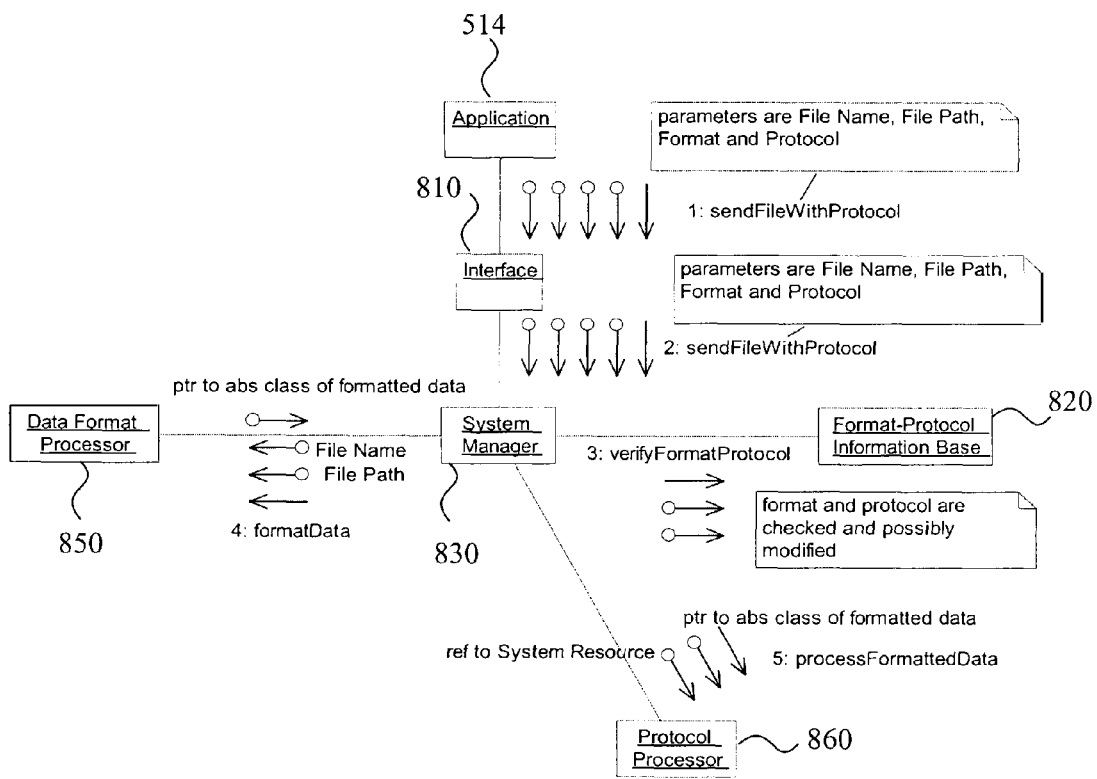
FIG. 14 illustrates exemplary processing when the application software instructs a DLL to send a file.

FIG. 14 illustrates the process of sending the file which includes the monitoring information (e.g., after the sendFileWithProtocol( ) function is called as shown in FIG. 13B). In steps 1 and 2, the application 514 sends to the system manager 830, through the interface 810, parameter values for the file name, file path, data format and communication protocol using the C++ function call sendFileWithProtocol( ). In step 3, the system manager 830 verifies the combination of the data format and communication protocol using the verifyFormatProtocol( ) function of the format and protocol information base 820. In step 4, the system manager 830 passes the file location information to the data format processor 850 through the formatData( ) function and receives a pointer to the abstract class of formatted data. In step 5, the system manager 830 then passes the returned pointer and a reference to the system resource interface 900 through the processFormattedData( ) function to an appropriate protocol processor 860 to send the formatted data.

Figure 15:
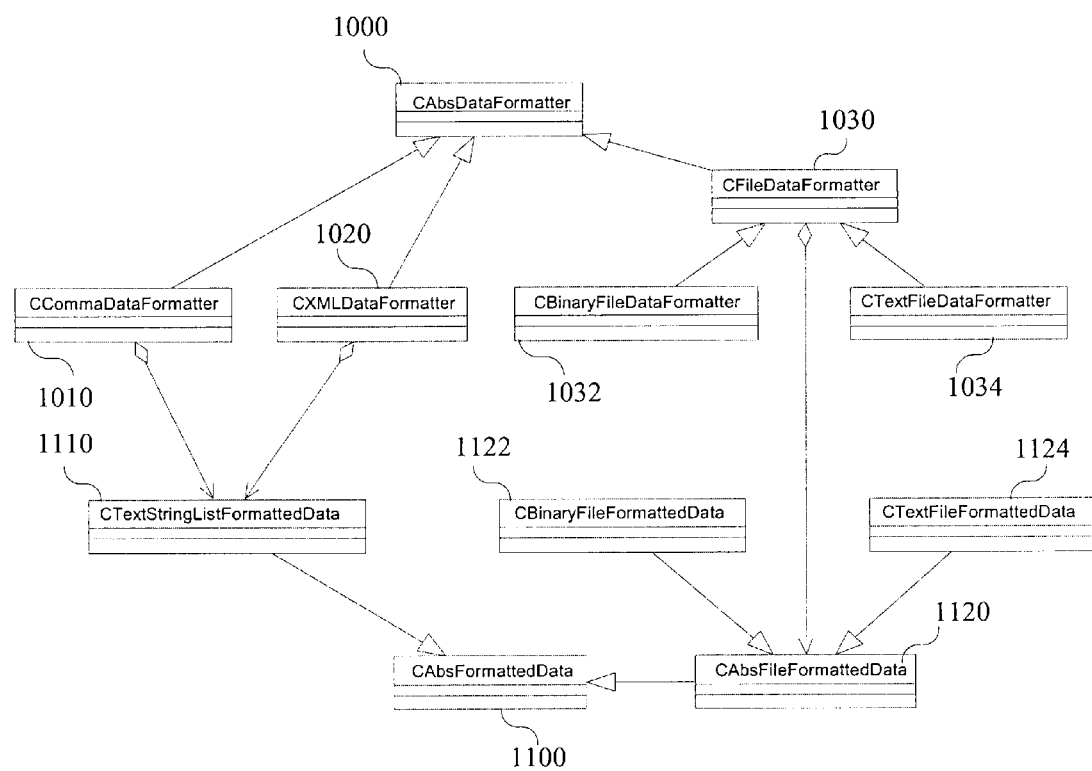
FIG. 15 is an exemplary class structure used to format the monitored sequence data or a specified file.

FIG. 15 illustrates an exemplary class structure inside the data format processor 850 of FIG. 12A. A CAbsDataFormatter class 1000 of FIG. 15 defines the interfaces among all the formatters. The virtual function formatData( ) includes two overloaded functions, one function defined with one parameter (a pointer to the abstract event data) and the other defined with two parameters (a file path and a file name), both of which return a pointer to CAbsFormattedData 1100. Exemplary declarations of interface functions in CAbsDataFormatter 1000 are as follows:

virtual CAbsFormattedData*formatData
        (CAbsEventData*in_pEventData)=0;

virtual CAbsFormattedData*formatData (std::string
        in_sFilePath, std::string in_sFileName)=0;

The assignments of a value of 0 denote that the class is an abstract class. The interface functions of the CAbsFormattedData 1100 are as follows:
    enum DataType {Text=1, Binary=2};
    CAbsFormattedEventData( );
    virtual ~CAbsFormattedEventData( );
    virtual bool getNextLine (string & out_sLine)=0;
    string getFileNameWithSuffix( );
    void setFileNameWithSuffix(string in_sFileName);
    virtual DataType getDataType(void)=0;
The functions getNextLine( ), getFileNameWithSuffix( ), and getDataType( ) are described in FIG. 12C. The type of the data to be handled is defined by enum DataType. The CAbsFormattedData 1100 includes one attribute to track the file name and suffix. CFileDataFormatter 1030 handles the actual file opening through a virtual function openFile( ) in CAbsFileFormattedData 1120 based upon the file path and file name values. The derived classes CBinaryFileDataFormatter 1032 and CTextFileDataFormatter 1034 set up the target formatted data CBinaryFileFormattedData 1122 and CTextFileFormattedData 1124, respectively, in the attribute of the base class CFileDataFormatter 1030 within the constructor. They destroy the created formatted data within the destructor. By having the intermediate class CFileDataFormatter 1030 and the CAbsFileFormattedData 1120, code duplication for opening the file to be handled by the processor is eliminated. The other two formatters, CCommaDataFormatter 1010 and CXMLDataFormatter 1020, share the same formatted data structure CTextStringListFormattedData 1110.

Figure 16:
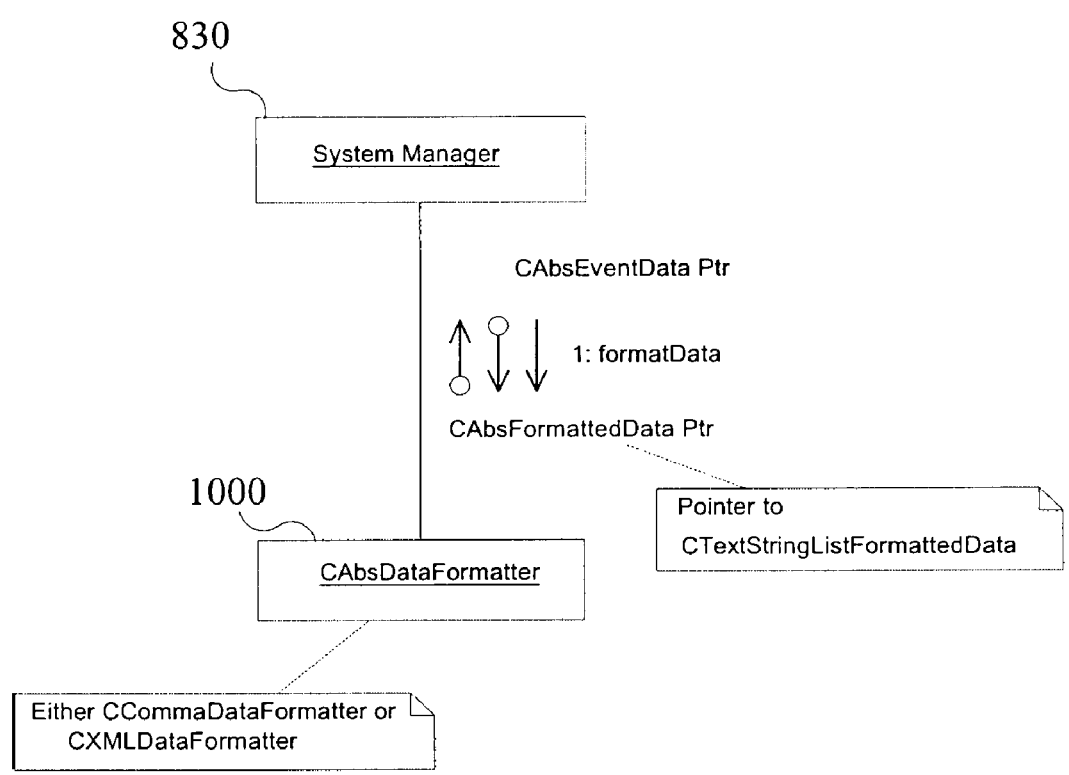
FIG. 16 illustrates an exemplary formatting process of the monitored event data through a formatter to create a text string list of formatted data.

FIG. 16 illustrates an exemplary embodiment for formatting the monitored event data. In step 1, the system manager 830 passes a pointer to the CAbsEventData object (more specifically, a pointer to the object of the derived class) to the CAbsDataFormatter 1000 (more specifically, an object of the derived class CCommaDataFormatter 1010 or CXMLDataFormatter 1020) through the function formatData( ), which is an overloaded function. Because one parameter of type pointer to the CAbsEventData is passed, the correct function is called. The function formatData( ) returns a pointer to an object of CAbsFormattedData 1100 (i.e., an object of the derived class CTextStringListFormattedData 1110).

Figure 17:
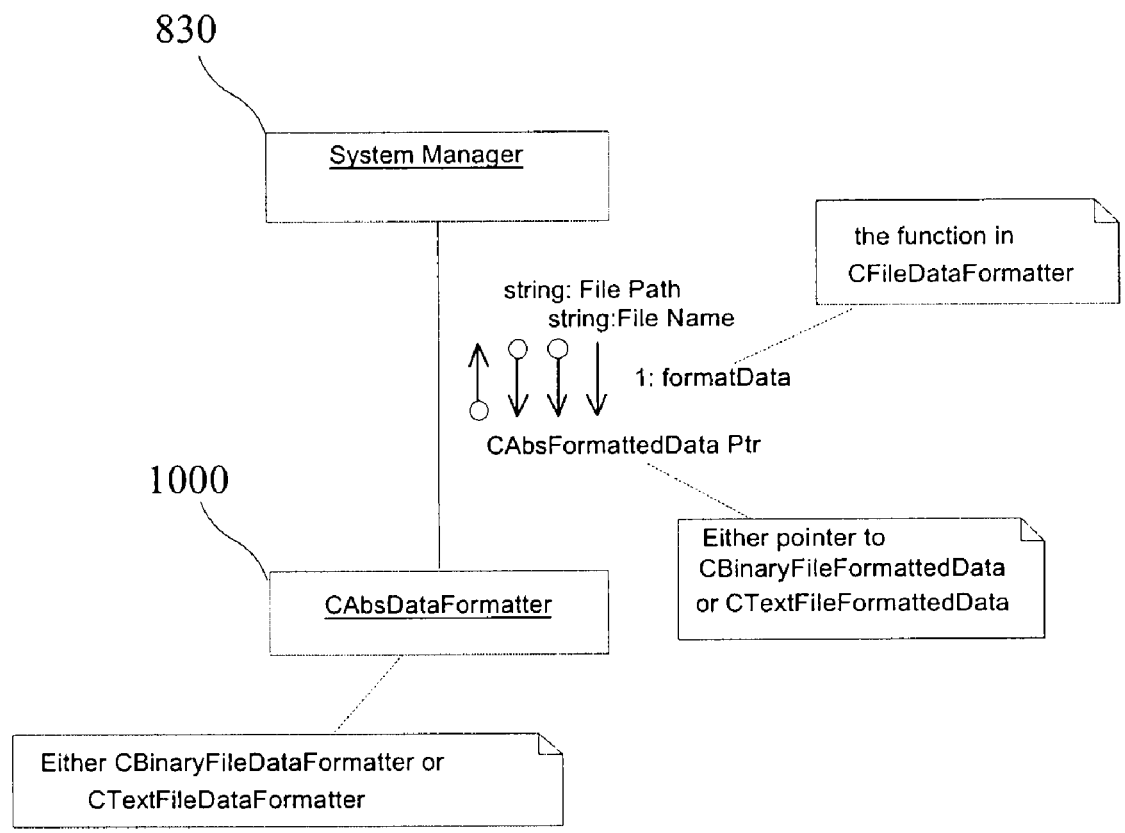
FIG. 17 illustrates an exemplary formatting process of a file which may contain any data including the monitored event data or system log.

FIG. 17 illustrates an exemplary embodiment for formatting the file object to be sent to a predetermined destination. In step 1, the system manager 830 passes two strings defining the file location, i.e., the file path and file name to the CAbsDataFormatter 1000 (i.e., an object of the derived classes, CBinaryFileDataFormatter 1032 or CTextFileDataFormatter 1034). The function formatData( ), however, is defined in the CFileDataFormatter 1030 using the interface function of the CAbsFileFormattedData 1120. The formatData( ) function returns a pointer to an object of CAbsFormattedData 1100 (i.e., an object of the derived class CBinaryFileFormattedData 1122 or CTextFileFormattedData 1124).

The advantage of using the abstract classes is shown in the following listing of the source code fragments:

```
CAbsEventData * loc_pAbsEventData =
m_UsageLogger.getEventData( );
if(NOT loc_pAbsEventData) return;
int loc_nFormat;
std::vector<int> loc_ProtocolVector;
while(m_FormatProtocol_InformationBase.-
   getFormatAndProtocolVector(loc_nFormat, loc_ProtocolVector)){
   CAbsDataFormatter * loc_pAbsDataFormatter =
   m_ProcessorBuilder.createDataFormatProcessor(loc_nFormat);
if(NOT loc_pAbsDataFormatter) continue;
CAbsFormattedData * loc_pAbsFormattedData =
   loc_pAbsDataFormatter->formatData(loc_pAbsEventData);
..........}
```

There is no need to address the concrete data formatter and concrete formatted data objects in the source code. Although there are four data formatter classes 1010, 1020, 1032, and 1034 in FIG. 15 and three formatted data classes 1110, 1122, and 1124, only the CAbsDataFormatter 1000 and CAbsFormattedData 1100 are referenced in the code. New data formatters and new formatted data can be added without changing the above code. The new data formatter should be of a derived class of CAbsDataFormatter 1000 and the new formatted data should be of a derived class of CAbsFormattedData 1100.

Figure 18:
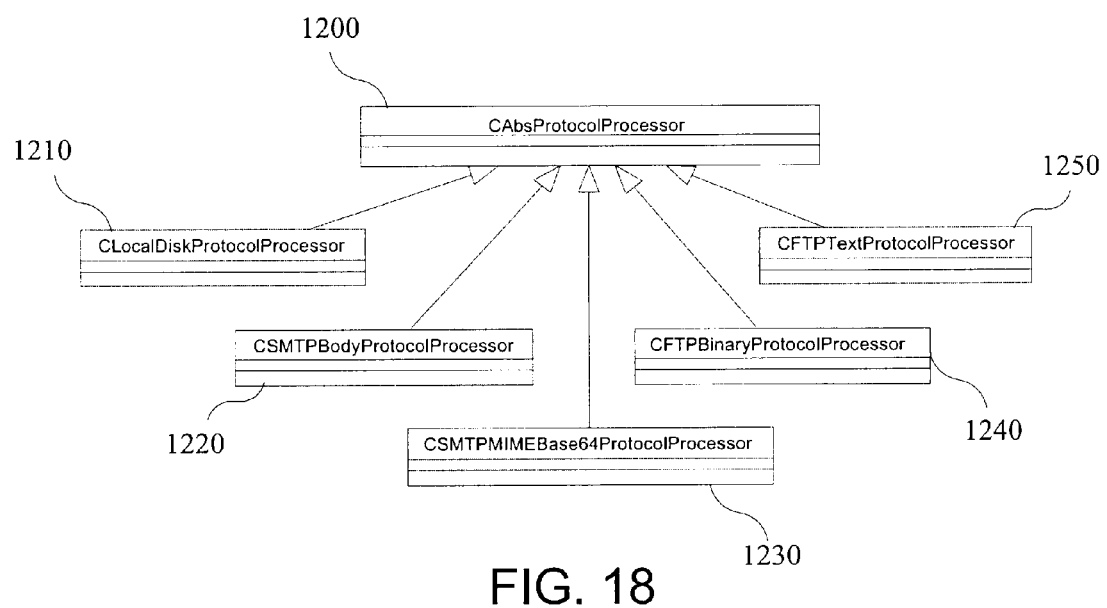
FIG. 18 is an exemplary class structure for communication protocol processors.

FIG. 18 illustrates an exemplary class structure of the protocol processor 860 of FIG. 12A. CAbsProtocolProcessor 1200 includes the interface virtual function, processFormattedData( ), which passes two parameters: a pointer to the abstract formatted data 1000 and a reference to the system resource interface 900. CAbsProtocolProcessor 1200 has five derived classes CLocalDiskProtocolProcessor 1210, CSMTPBodyProtocolProcessor 1220, CSMTPMIMEBase64ProtocolProcessor 1230, CFTPBinaryProtocolProcessor 1240, and CFTPTextProtocolProcessor 1250. Each of the derived classes defines the method to process the formatted data for the respective derived class.

Figure 19:
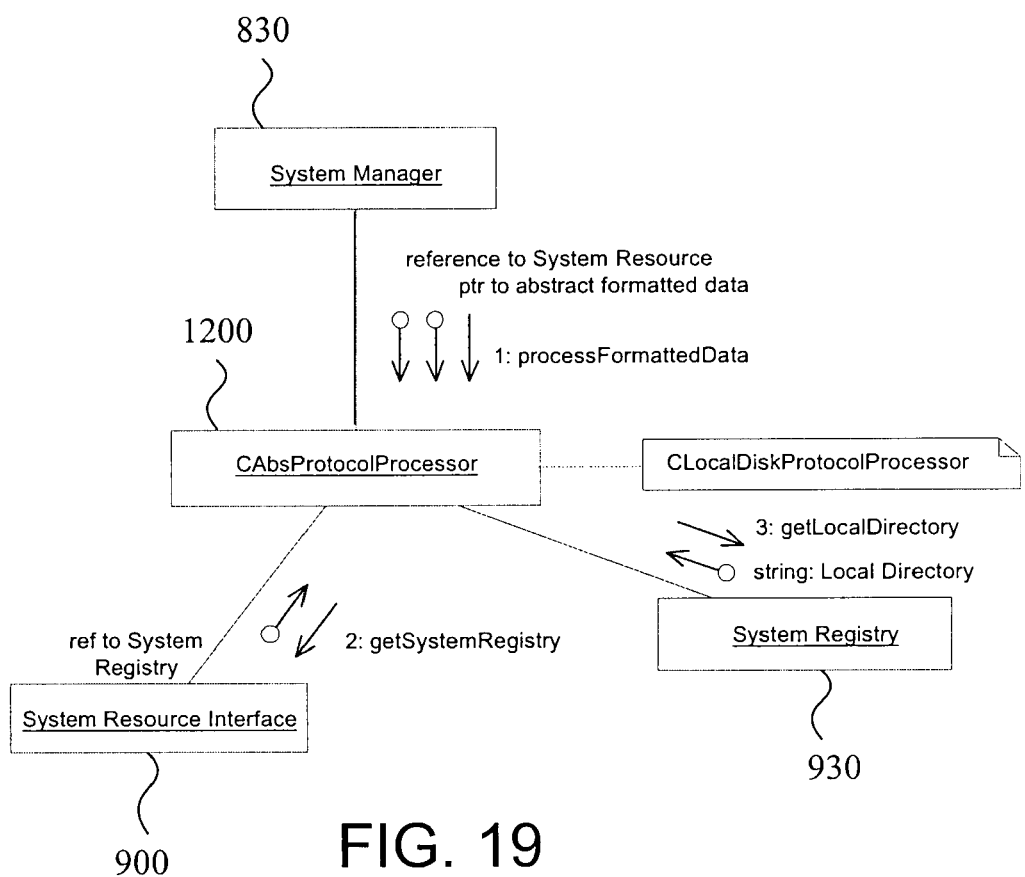
FIG. 19 illustrates exemplary processing when the application software instructs the system to save the monitored event data to a local disk.

FIG. 19 illustrates exemplary steps to save the data to a local disk. In step 1, the system manager 830 passes to the CAbsProtocolProcessor 1200 which was discussed previously with regard to FIG. 18, using the function processFormattedData( ), a reference to the system resource 870 and a pointer to the abstract formatted data. For this task, the CAbsProtocolProcessor 1200 is an object of the derived class CLocalDiskProtocolProcessor 1210. In step 2, the processFormattedData( ) function of CLocalDiskProtocolProcessor 1210 obtains the reference to the system registry 930 from the system resource interface 900 using a getSystemRegistry( ) function. In step 3, the directory where the data is to be saved is obtained from the system registry 930 using a getLocalDirectory( ) function. The interface functions of the CAbsFormattedData 1100 in FIG. 12C are used to define the file name to be saved and to extract the data to be saved from the abstract formatted data.

Figure 20:
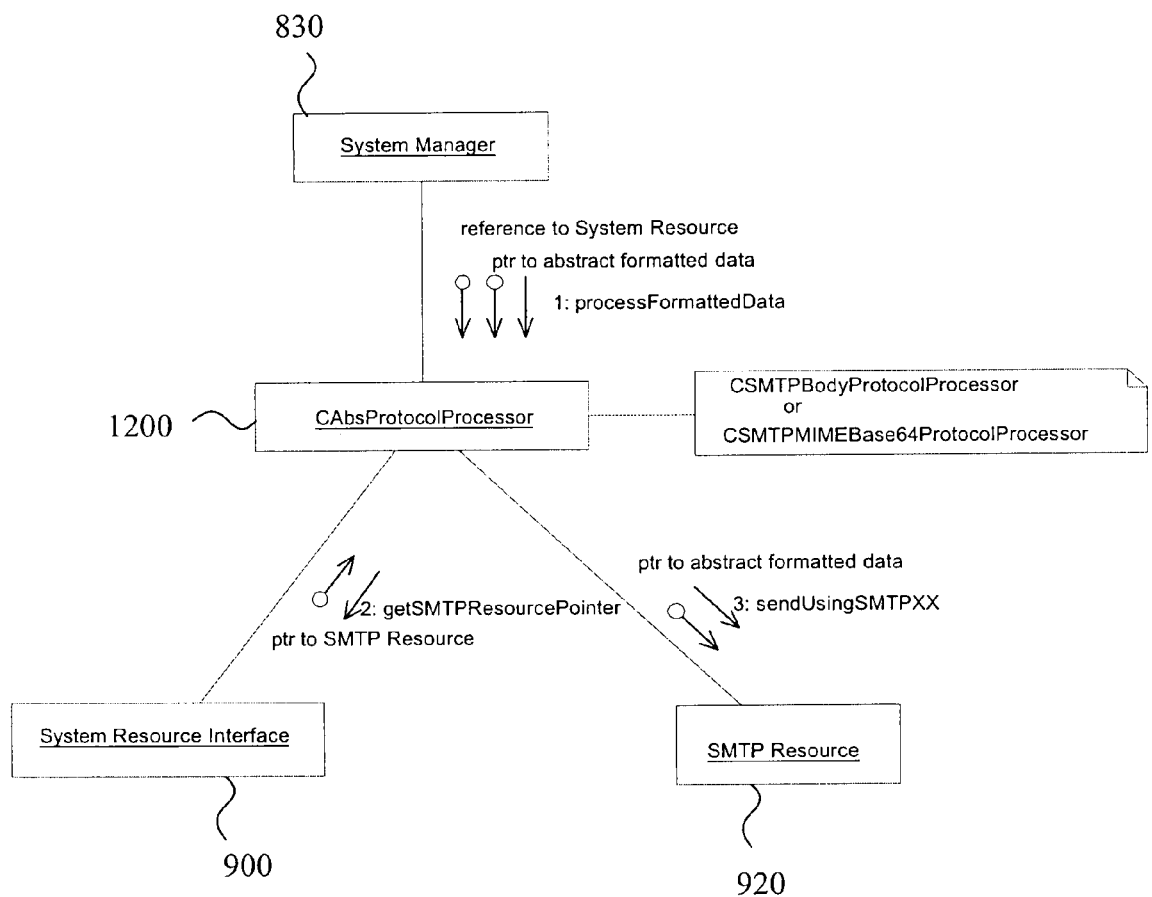
FIG. 20 illustrates exemplary processing when the application software instructs the system to send the monitored event data through Simple Mail Transfer Protocol (SMTP)

FIG. 20 illustrates exemplary steps to send the information including monitoring data through SMTP. In step 1, the system manager 830 passes two parameters to CAbsProtocolProcessor 1200 through the function processFormattedData( ). For this task, the CAbsProtocolProcessor 1200 is an object of the derived class CSMTPBodyProtocolProcessor 1220 or CSMTPMIMEBase64ProtocolProcessr 1230. In step 2, the processFormattedData( ) virtual function obtains the pointer to the SMTP Resource 920 from the system resource interface 900 using a getSMTPResourcePointer( ) function. In step 3, the virtual function passes a pointer to the abstract formatted data to the correct interface function sendUsingSMTPXX( ) of an SMTP resource class where XX indicates a value of 10 or 30 as shown in Table 2 which was discussed previously. The interface functions of the CAbsFormattedData 1100 in FIG. 12C are used to define the file name to be saved and to extract the data to be saved from the abstract formatted data within the SMTP resource 920.

Figure 21:
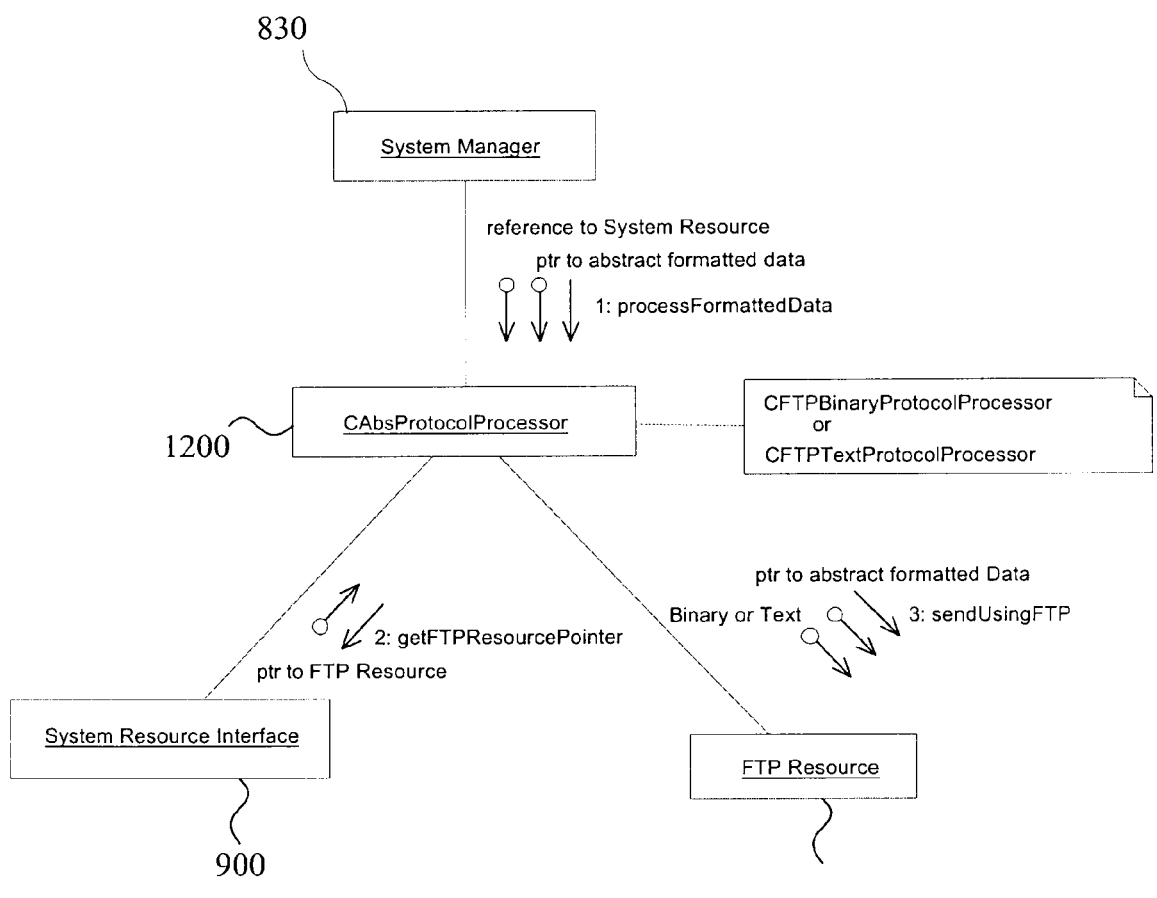
FIG. 21 illustrates exemplary processing when the application software instructs the system to send the monitored event data through File Transfer Protocol (FTP)

FIG. 21 illustrates exemplary steps to send the information including monitoring data through FTP. In step 1, the system manager 830 passes two parameters, a reference to the system resource 870 and a pointer to the abstract formatted data, to CAbsProtocolProcessor 1200 through the function processFormattedData( ). For this task, the CAbsProtocolProcessor 1200 is an object of the derived class CFTPBinaryProtocolProcessor 1240 or CFTPTextProtocolProcessor 1250. In step 2, the processFormattedData( ) virtual function obtains a pointer to FTP resource 910 from the system resource interface 900 using a getFTPResourcePointer( ) function. In step 3, the virtual function passes the pointer to the abstract formatted data and the information indicating binary or text format using the function sendUsingFTP( ) to the FTP resource class 910. The interface functions of the CAbsFormattedData 1100 in FIG. 12C are used to define the file name to be saved and to extract the data to be saved from the abstract formatted data within the FTP resource 910.

An advantage of using the abstract classes is shown in the following code fragment:

```
for (std::vector<int>::iterator loc__ProtocolVectorIterator =
    loc__ProtocolVector.begin( );
        loc__ProtocolVectorIterator NE loc__ProtocolVector.end( );
        loc__ProtocolVectorIterator ++){
    CAbsProtocolProcessor * loc__pAbsProtocolProcessor =
        m__ProcessorBuilder.-
            createProtocolProcessor(* loc__ProtocolVectorIterator);
    if(NOT loc__pAbsProtocolProcessor) continue;
    loc__pAbsProtocolProcessor->
    processFormattedData(loc__pAbsFormattedData,
        m__SystemResourceInterface);
}
```

Although there are five different protocol processors 1210, 1220, 1230, 1240, and 1250 in FIG. 18, the code needs to reference only the abstract class CAbsProtocolProcessor 1200. New protocol processors can be easily added without changing the above code through a derived class of CAbsProtocolProcessor 1200.

Figure 22:
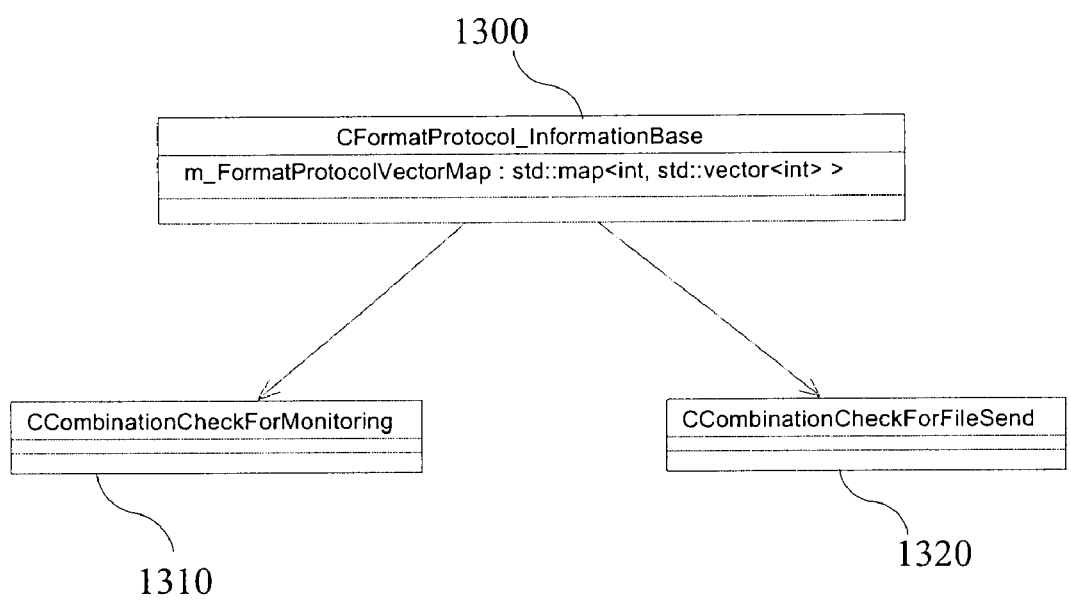
FIG. 22 illustrates an exemplary class structure of a format and protocol information base.

FIG. 22 illustrates an exemplary class structure of the format and protocol information base 820 shown in FIG. 12A. A CFormatProtocol_InformationBase class 1300 includes an attribute which represents a map structure with an integer value as a key and a vector of integer values as a value of the attribute. The CFormatProtocol_InformationBase class 1300 also contains two classes to assist the verification of the input values for the data format and communication protocol. A CCombinationCheckForMonitoring class 1310 is used for an event monitoring application and a CCombinationCheckForFileSend class 1320 is used for sending a file.

Figure 23:
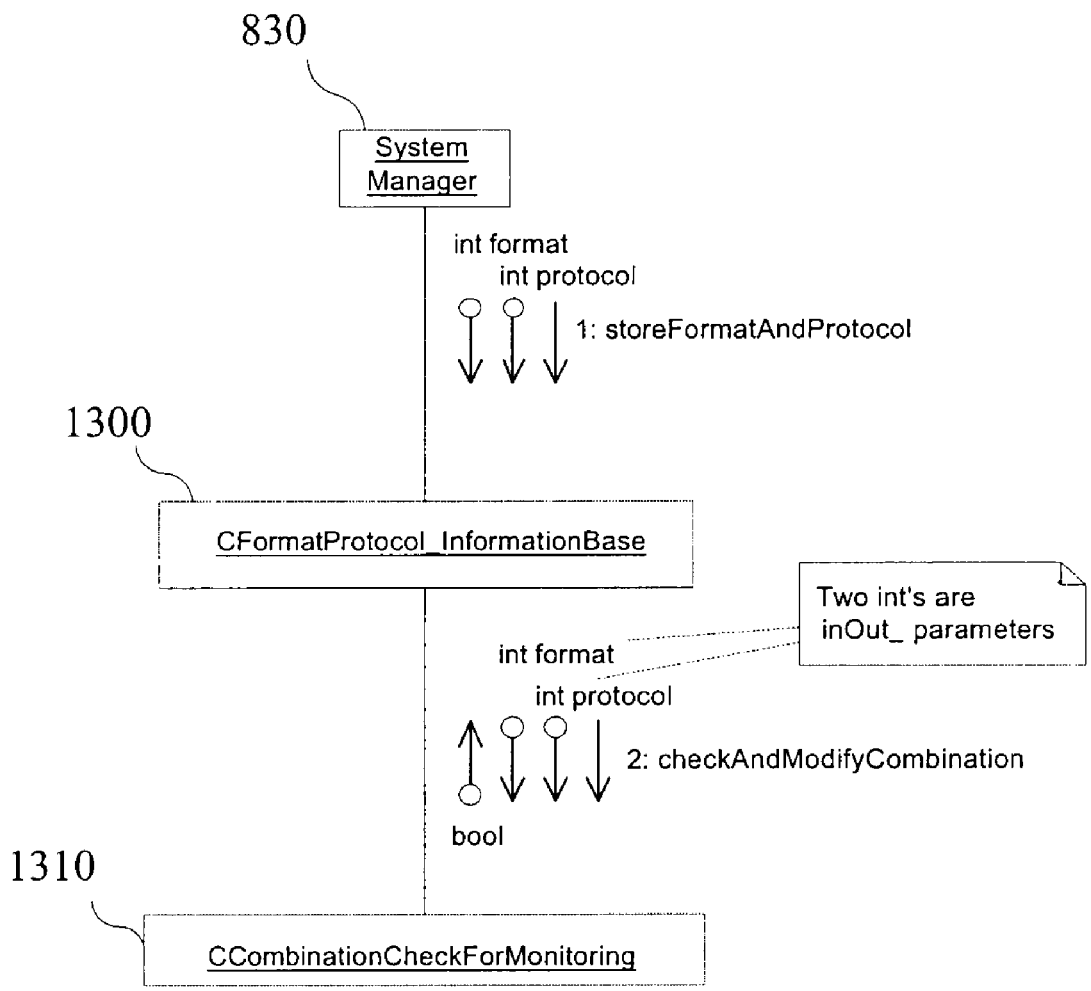
FIG. 23 is an exemplary interaction diagram using a store-FormatAndProtocol( ) function of a CFormatProtocol_InformationBase class.

FIG. 23 is an interaction diagram showing the system manager 830 using the storeFormatAndProtocol( ) function of the CFormatProtocol_InformationBase class 1300. In step 1, two integer parameters indicating a data format and a communication protocol are passed from the application 514 via the system manager 830 through the storeFormatAndProtocol( ) interface function. In step 2, the two integer values are passed to the CCombinationCheckForMonitoring class 1310, which was discussed previously with regard to FIG. 22, through a function checkAndModifyCombination( ). If the input values are not modified, the function checkAndModifyCombination( ) returns a value of true; otherwise, the function returns a value of false. When the checkAndModifyCombination( ) function returns a value of false, either one or both of the integer values are changed. Therefore, the CFormatProtocol_InformationBase class 1300 should check whether the two values are already in the m_FormatProtocolVectorMap shown in FIG. 22. If the combination is not in the map, the return values are inserted in the m_FormatProtocolVectorMap. If the function returns a value of true, the two integer values are inserted in the m_FormatProtocolVectorMap.

Figure 24:
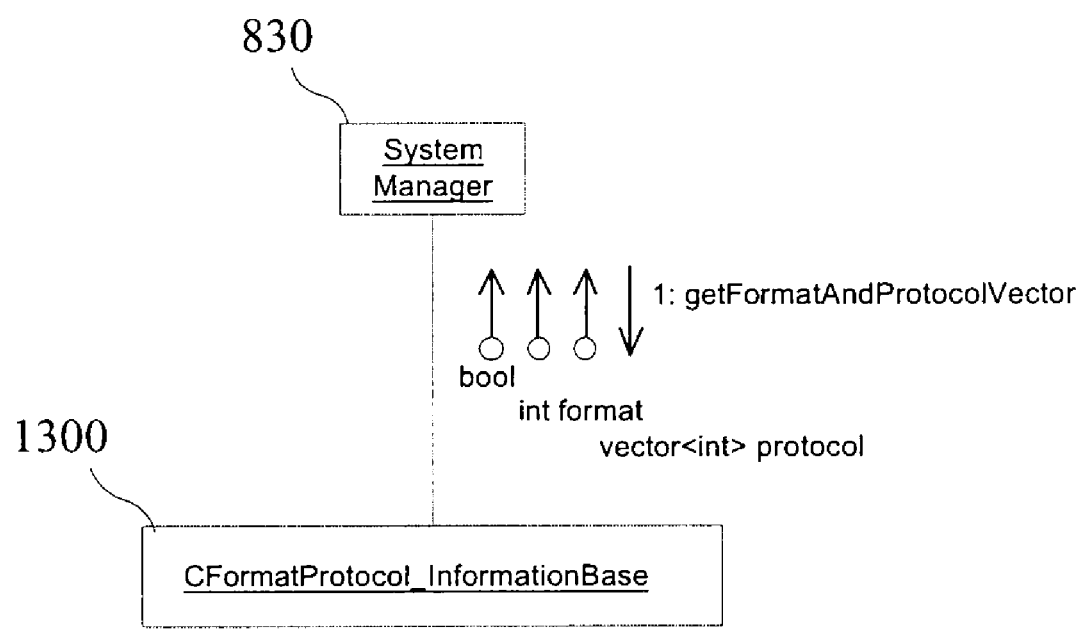
FIG. 24 is an exemplary interaction diagram using a getFormatAndProtocolVector( ) function of the CFormatProtocol_InformationBase class.

FIG. 24 is an exemplary interaction diagram for obtaining a data format and a communication protocol vector. In step 1, the system manager 830 calls a function getFormatAndProtocolVector( ) to return the data format and communication protocol vector from the CformatProtocol_InformationBase class 1300, which was discussed previously with regard to FIG. 22. The getFormatAndProtocolVector( ) function returns a value of true when the data format and communication protocol vector values are returned. The getFormatAnd-ProtocolVector( ) function returns a value of false when there is no more data format with communication protocol vector combination.

Figure 25:
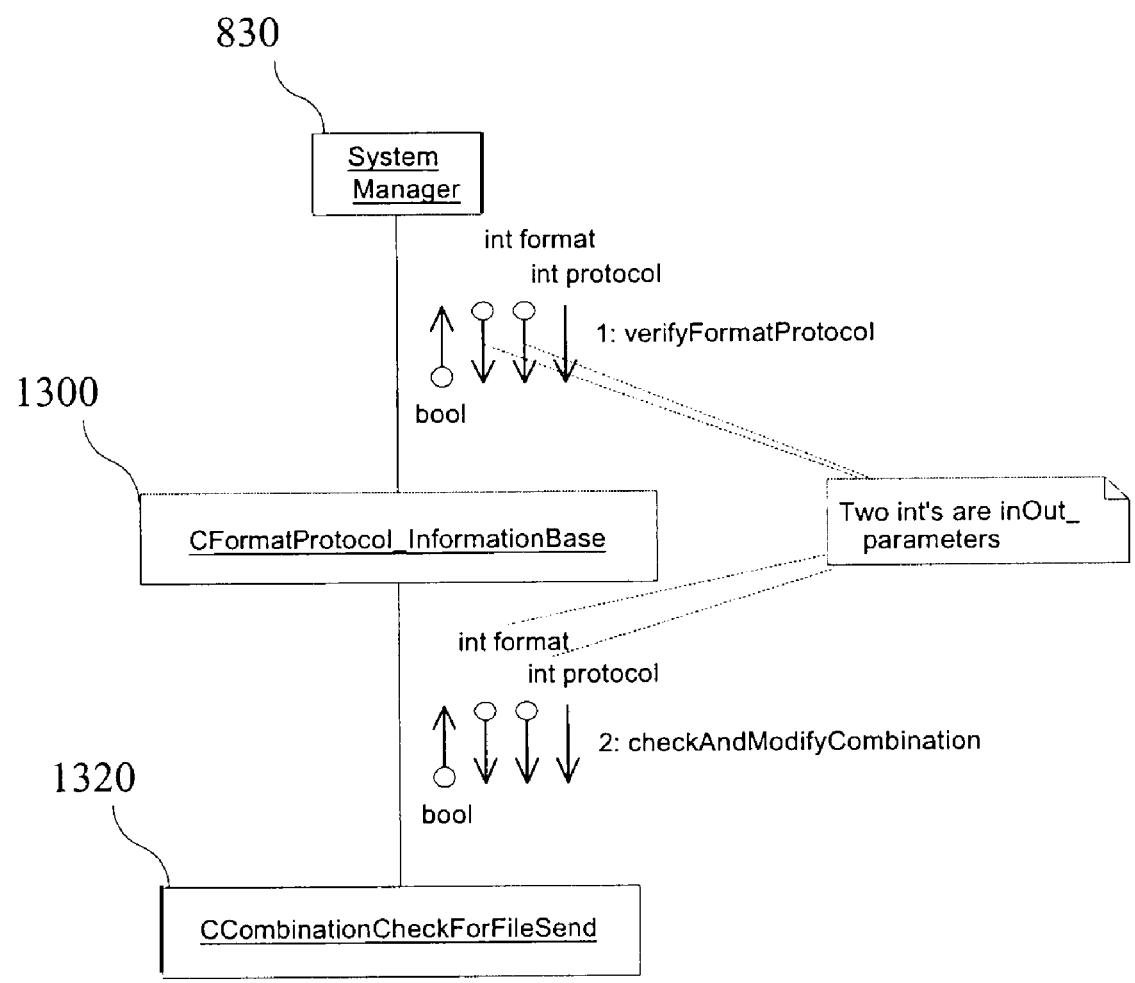
FIG. 25 is an exemplary interaction diagram using a verifyFormatProtocol( ) function of the CFormatProtocol_InformationBase class.

FIG. 25 illustrates an exemplary interaction diagram when the system manager 830 uses the verifyFormatProtocol( ) function of the CFormatProtocol_InformationBase class 1300 to check the combination of data format and communication protocol for processing a file. In step 1, the system manager 830 calls the verifyFormatProtocol( ) function to pass two integers indicating a data format and a communication protocol to the CFormatProtocol_InformationBase 1300 which was discussed previously with regard to FIG. 22. In step 2, the two values are passed to the CCombinationCheckForFileSend class 1320 through a function checkAndModifyCombination( ). If the two integer input values are not modified, the checkAndModifyCombination( ) function returns a value of true. Otherwise it returns a value of false with one or both of the two integer input values modified.

FIG. 26A illustrates an exemplary data structure used by CCombinationCheckForMonitoring 1310 to check the combination of the data format and communication protocols. FIG. 26A is a map structure where the key is of data type integer and the value is another data structure which is a set of values. The map and set have a function find( ) that returns an iterator of the structure. If the function find( ) returns the end, the searched value is not in the structure.

FIG. 26B illustrates an exemplary algorithm of the checkAndModifyCombination( ) function discussed previously with regard to FIG. 23. Two integers inOut_nFormat and inOut_nProtocol are passed through the function parameters. In step 1, the return Boolean value is set to true. In step 2, the find( ) function is used for the map as shown in FIG. 26A to determine whether the passed data format inOut_nFormat is found in the key field. In step 3 of FIG. 26B, if the data format is not found, the value is set to a default data format value and the return Boolean value is set to false. In step 4, the set corresponding to the data format is obtained from the map as shown in FIG. 26A. In step 5, the find( ) function of the set is used to determine whether the passed communication protocol inOut_nProtocol is in the set which was obtained in step 4. In step 6, if the communication protocol is not found, the communication protocol is set to a default value and the return Boolean is set to a value of false. In step 7, the function returns the value of return-bool. The map structure is very flexible and if a new format such as binary encoding of the monitored data is used, the map can be expanded to accommodate such an encoding. For this example, the corresponding set in the map for the binary encoding format should not contain 10 and 100 because they correspond to the Text handling protocols.

FIG. 27A illustrates an exemplary data structure used by CCombinationCheckForFileSend 1320 discussed previously with regard to FIGS. 22 and 25 to check the combination of the data format and communication protocols. FIG. 27A is a map structure wherein the key is type integer (1 or 5) for data format and the value is also a map structure. The second map structure contains a key and value of integers (1, 10, 30, 100, and 105) for communication protocols. In this implementation, the data format value of 5 can not be used with the communication protocol values of 10 and 100 which are for text. Therefore, the communication protocol values are changed to 30 and 105 respectively.

FIG. 27B illustrates an algorithm of the checkAndModifyCombination( ) function discussed previously with regard to FIG. 25 that is similar to FIG. 26B discussed previously, the main difference being an "else" clause in step 6. Similarly to the algorithm of FIG. 26B, the return-bool is set to a value of false if either inOut_nFormat or inOut_nProtocol is changed by the call to the checkAndModifyCombination( ) function. In the "else" clause, return-bool is computed as the logical-AND of a result of checking the inOut_nFormat from step 3 with the result of checking the inOut_nProtocol.

This invention may be conveniently implemented using a network of conventional general purpose digital computers and/or microprocessors programmed according to the teachings of the present specification, as will be apparent to those skilled in the computer art from reading the above descriptions regarding the figures. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or other device, or a plurality of networked computers or other devices, to perform a process of the invention. The storage medium can include, but is not limited to, any type of disk including floppy disks, optical discs, CD-ROMs, and magneto-optical disks, ROMs, RAMs, PROMs, EPROMs, EEPROMs, magnetic or optical cards, or any type of media suitable for storing electronic instructions.

Stored on any one or on a combination of computer readable media, the present invention includes software for driving a device or devices for implementing the invention. Such software may include, but is not limited to, device drivers, operating systems, development tools, and applications software. Such computer readable media further includes the computer program product of the present invention. The instructions stored on the computer program product drive a device or devices for implementing the invention. This device, or these devices, have been described, or are known to those of ordinary skill in the art. The computer code devices of the present invention can be any interpreted or executable code mechanism, including but not limited to scripts, interpreters, dynamic link libraries, Java classes, and complete executable programs.

Obviously, numerous modifications and variations of the present invention are possible in light of the above teachings. It is therefore to be understood that, within the scope of the appended claims, the invention may be practiced otherwise than as specifically described herein.

The invention claimed is:

1. An apparatus for collecting information regarding execution of a target software application residing in the apparatus, the apparatus being one of an image printing device and an appliance, comprising:
a monitoring software device having a plurality of monitoring components including an event logger;
a target application software interface configured to receive event data of the target software application and a plurality of instructions regarding monitoring of the target software application from the target software application for processing by the monitoring device; and
a system resource having at least one system resource component shared among the plurality of monitoring components using at least one abstract class;
wherein the monitoring software device is configured to process the instructions sent from the target software application, the instructions including (1) instructions for sending previously stored event data of the target software application to a remote site, (2) instructions for setting a data format and a communication protocol by which the previously stored event data is to be sent to the remote site, and (3) instructions for storing the event data of the target software application in a storage device.

2. The apparatus according to claim 1, wherein the at least one system resource component includes at least one of a system clock, persistent system information storage, electronic mail transfer code, and file transfer code.

3. The apparatus according to claim 1, wherein at least one of the plurality of monitoring components accesses the system resource using a system resource interface.

4. The apparatus according to claim 1, wherein the target application includes one of a software program being executed on a computer or workstation under control of a user, a software program driving a control panel of a business device, a software program driving a control panel of an appliance, software generating data regarding state changes within a device, and software generating data regarding state changes within an appliance.

5. The apparatus according to claim 1, wherein the information regarding execution of a target application includes at least one of a user identification, an application identification, a cumulative session number, a value of a starting time, a value of a duration, and an indication of a sequence of events with a corresponding elapsed time for each one of the events.

6. The apparatus according to claim 1, wherein the at least one system resource component includes a persistent system registry used for storing at least one of an application identification, a value indicating a cumulative usage, an indication of a local directory, a user identification, an indication of a Simple Mail Transfer Protocol (SMTP) server, an indication of at least one recipient of data to be transmitted, an indication of a value of from data for data to be transmitted, an indication of a File Transfer Protocol (FTP) server, an indication of an FTP user, an indication of an FTP password, and an indication of an FTP target path.

7. The apparatus according to claim 1, wherein the monitoring device having a plurality of monitoring components includes an event logger and wherein the at least one system resource component includes a system clock, wherein the event logger accesses the system clock at least for recording a time of starting a monitoring session.

8. The apparatus according to claim 1, wherein the monitoring device having a plurality of monitoring components includes a transmitting device configured to transmit, to a predetermined recipient, formatted data corresponding to the information regarding execution of the target application.

9. The apparatus according to claim 8, wherein the monitoring device having a plurality of monitoring components includes a formatting device configured to process the information regarding execution of the target application into the formatted data to be transmitted by the transmitting device.

10. The apparatus according to claim 9, wherein the formatting device includes a data format processor configured to format the information regarding execution of the target application according to a requested data format.

11. The apparatus according to claim 8, wherein the transmitting device includes a protocol processor configured to transmit the formatted data through a requested communication protocol.

12. The apparatus according to claim 11, wherein the at least one system resource component includes electronic mail transfer code and file transfer code, and wherein the protocol processor is configured to access at least one of the electronic mail transfer code and the file transfer code for transmitting the formatted data through the requested communication protocol.

13. A computer-implemented method for collecting information from a target software application residing in a device unit, the method comprising:
obtaining, from the target software application through a software interface, by a monitoring software device residing in the device unit and having a plurality of monitoring components, event data of the target software application and a plurality of instructions regarding monitoring of the target software application, wherein the plurality of monitoring components includes an event logger; and
processing, by the monitoring software device, the instructions sent from the target software application, wherein the instructions include instructions for sending previously stored event data of the target software application to a remote site, instructions for setting a data format and a communication protocol by which the previously stored event data is to be sent to the remote site, and instructions for storing the event data of the target software application in a storage device, wherein the processing step includes the steps of accessing a shared system resource and executing a plurality of instructions included in the system resource,
wherein the device unit is one of an image printing device and an appliance.

14. The method according to claim 13, wherein the system resource includes at least one of a system clock, persistent system information storage, electronic mail transfer code, and file transfer code.

15. The method according to claim 13, wherein each one of the plurality of monitoring components accesses the system resource using a system resource interface.

16. The method according to claim 13, wherein the target application includes one of a software program being executed on a computer or workstation under control of a user, a software program driving a control panel of a business device, a software program driving a control panel of an appliance, software generating data regarding state changes within a device, and software generating data regarding state changes within an appliance.

17. The method according to claim 13, wherein the information regarding execution of a target application includes at least one of a user identification, an application identification, a cumulative session number, a value of a starting time, a value of a duration, and an indication of a sequence of events with a corresponding elapsed time for each one of the events.

18. The method according to claim 13, wherein the system resource includes a persistent system registry used for storing at least one of an application identification, a value indicating a cumulative usage, an indication of a local directory, a user identification, an indication of a Simple Mail Transfer Protocol (SMTP) server, an indication of at least one recipient of data to be transmitted, an indication of a value of from data for data to be transmitted, an indication of a File Transfer Protocol (FTP) server, an indication of an FTP user, an indication of an FTP password, and an indication of an FTP target path.

19. The method according to claim 13, wherein the system resource includes a system clock, and wherein the event logger accesses the system clock at least for recording a time of starting a monitoring session.

20. The method according to claim 13, further comprising:
transmitting, to a predetermined recipient, formatted data corresponding to the information regarding execution of the target application.

21. The method according to claim 20, further comprising:
processing the information regarding execution of the target application into the formatted data to be transmitted by a transmitting device.

22. The method according to claim 21, wherein the step of processing the information includes formatting the information regarding execution of the target application according to a requested data format.

23. The method according to claim 20, wherein the step of transmitting includes transmitting, through a protocol processor, the formatted data through a requested communication protocol.

24. The method according to claim 23, wherein the system resource includes electronic mail transfer code and file transfer code, and wherein the protocol processor is configured to access at least one of the electronic mail transfer code and the file transfer code for transmitting the formatted data through the requested communication protocol.

25. A program product for collecting information from a target software application residing in a device unit, the program product comprising a non-transitory computer readable medium storing program instructions for causing a computer to perform the steps of:
obtaining, from the target software application through a software interface, by a monitoring software device residing in the device unit and having a plurality of monitoring components, event data of the target software application and a plurality of instructions regarding monitoring of the target software application, wherein the plurality of monitoring components includes an event logger; and
processing, by the monitoring software device, instructions sent from the target software application, wherein the instructions include instructions for sending previously stored event data of the target software application to a remote site, instructions for setting a data format and a communication protocol by which the previously stored event data is to be sent to the remote site, and instructions for storing the event data of the target software application in a storage device, wherein the processing step includes the steps of accessing a shared system resource and executing a plurality of instructions included in the system resource,
wherein the device unit is one of an image printing device and an appliance.

26. The program product according to claim 25, wherein the system resource includes at least one of a system clock, persistent system information storage, electronic mail transfer code, and file transfer code.

27. The program product according to claim 25, wherein at least one of the plurality of monitoring components accesses the system resource using a system resource interface.

28. The program product according to claim 25, wherein the target application includes one of a software program being executed on a computer or workstation under control of a user, a software program driving a control panel of a business device, a software program driving a control panel of an appliance, software generating data regarding state changes within a device, and software generating data regarding state changes within an appliance.

29. The program product according to claim 25, wherein the information regarding execution of a target application includes at least one of a user identification, an application identification, a cumulative session number, a value of a starting time, a value of a duration, and an indication of a sequence of events with a corresponding elapsed time for each one of the events.

30. The program product according to claim 25, wherein the system resource includes a persistent system registry used for storing at least one of an application identification, a value indicating a cumulative usage, an indication of a local directory, a user identification, an indication of a Simple Mail Transfer Protocol (SMTP) server, an indication of at least one recipient of data to be transmitted, an indication of a value of from data for data to be transmitted, an indication of a File Transfer Protocol (FTP) server, an indication of an FTP user, an indication of an FTP password, and an indication of an FTP target path.

31. The program product according to claim 25, wherein the system resource includes a system clock, and wherein the event logger accesses the system clock at least for recording a time of starting a monitoring session.

32. The program product according to claim 25, wherein the program instructions cause the system to further perform the step of transmitting, to a predetermined recipient, formatted data corresponding to the information regarding execution of the target application.

33. The program product according to claim 32, wherein the program instructions cause the system to further perform the step of processing the information regarding execution of the target application into the formatted data to be transmitted by a transmitting device.

34. The program product according to claim 33, wherein the step of processing the information includes formatting the information regarding execution of the target application according to a requested data format.

35. The program product according to claim 32, wherein the step of transmitting includes transmitting, through a protocol processor, the formatted data through a requested communication protocol.

36. The program product according to claim 35, wherein the system resource includes electronic mail transfer code and file transfer code, and wherein the protocol processor is configured to access at least one of the electronic mail transfer code and the file transfer code for transmitting the formatted data through the requested communication protocol.

* * * * *